US011988980B2

(12) United States Patent
Okuyama et al.

(10) Patent No.: US 11,988,980 B2
(45) Date of Patent: May 21, 2024

(54) IMAGE FORMING APPARATUS

(71) Applicant: FUJIFILM Business Innovation Corp., Tokyo (JP)

(72) Inventors: Shinji Okuyama, Ebina (JP); Aya Kakishima, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/873,633

(22) Filed: Jul. 26, 2022

(65) Prior Publication Data

US 2022/0357685 A1 Nov. 10, 2022

Related U.S. Application Data

(63) Continuation of application No. PCT/JP2020/029040, filed on Jul. 29, 2020.

(30) Foreign Application Priority Data

Mar. 16, 2020 (JP) ................................ 2020-045767

(51) Int. Cl.
*G03G 15/01* (2006.01)
*G03G 15/16* (2006.01)

(52) U.S. Cl.
CPC ....... *G03G 15/161* (2013.01); *G03G 15/0131* (2013.01); *G03G 15/1685* (2013.01)

(58) Field of Classification Search
CPC ............. G03G 15/0131; G03G 15/161; G03G 15/1615; G03G 15/162; G03G 15/1665; G03G 15/1685
See application file for complete search history.

(56) References Cited

U.S. PATENT DOCUMENTS 4,875,069 A 10/1989 Takada et al.
5,960,716 A * 10/1999 Schaede ................. B41F 21/10 101/118

(Continued)

FOREIGN PATENT DOCUMENTS

JP S63-180648 A 7/1988
JP H02-157872 A 6/1990

(Continued)

OTHER PUBLICATIONS

Oct. 20, 2020 Search Report issued In International Patent Application No. PCT/JP2020/029040.

(Continued)

*Primary Examiner* — Hoang X Ngo
(74) *Attorney, Agent, or Firm* — Oliff PLC

(57) ABSTRACT

An image forming apparatus includes an image-carrying component configured to carry a colorant image including an adjustment image, a transferring component having a recess in an outer peripheral surface and configured to transfer the colorant image from the image-carrying component to a recording medium in a transfer area while rotating in such a manner as to allow a retainer that is retaining the recording medium to pass through the recess, a transporting component configured to cause the recording medium retained by the retainer to pass through the transfer area, and a shielding component configured to shield the recess of the transferring component from colorant particles composing the colorant image.

19 Claims, 24 Drawing Sheets

(56) References Cited

U.S. PATENT DOCUMENTS

| | | | | |
|---|---|---|---|---|
| 6,089,158 | A | 7/2000 | Barroso | |
| 8,391,757 | B2 | 3/2013 | Mizushima et al. | |
| 8,718,521 | B2 * | 5/2014 | Chiba ................ | G03G 15/1615 399/304 |
| 9,446,612 | B1 | 9/2016 | Butterfield | |
| 2011/0026980 | A1 | 2/2011 | Mizushima et al. | |

FOREIGN PATENT DOCUMENTS

| | | | |
|---|---|---|---|
| JP | H03-134690 | A | 6/1991 |
| JP | 2000-169009 | A | 6/2000 |
| JP | 2004-271804 | A | 9/2004 |
| JP | 2011-033856 | A | 2/2011 |
| JP | 2012-224015 | A | 11/2012 |
| JP | 2016-156860 | A | 9/2016 |

OTHER PUBLICATIONS

Oct. 20, 2020 Written Opinion of the International Searching Authority issued In International Patent Application No. PCT/JP2020/029040.

Oct. 10, 2023 Office Action issued in Japanese Patent Application No. 2020-045767.

* cited by examiner

IMAGE FORMING APPARATUS

CROSS-REFERENCE TO RELATED APPLICATIONS

This is a continuation of International Application No. PCT/JP2020/029040 filed on Jul. 29, 2020, and claims priority from Japanese Patent Application No. 2020-045767 filed on Mar. 16, 2020,

BACKGROUND

(i) Technical Field

The present disclosure relates to an image forming apparatus.

(ii) Related Art

There are various known technologies relating to an image forming apparatus, such as the one disclosed by Japanese Unexamined Patent Application Publication No. 2012-224015.

Japanese Unexamined Patent Application Publication No. 2012-224015 relates to a film-handling apparatus including a transporting body and a pressing body. The transporting body is provided with a sheet-retaining component configured to retain a sheet, and is configured to transport the sheet retained by the sheet-retaining component. The pressing body is pressed against the transporting body and has a pressing peripheral surface and a notch. The pressing body is configured to press at the pressing peripheral surface thereof a film against the sheet transported by the transporting body. The notch extends in the axial direction of the pressing body. The notch of the pressing body is provided with a covering that has a guiding peripheral surface whose curvature is substantially the same as the curvature of the pressing peripheral surface.

SUMMARY

Aspects of non-limiting embodiments of the present disclosure relate to reducing the probability that colorant particles enter a recess provided in a transferring component, compared with a case where the recess of the transferring component is open to an image carrying component configured to carry a colorant image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including an image-carrying component configured to carry a colorant image including an adjustment image, a transferring component having a recess in an outer peripheral surface and configured to transfer the colorant image from the image-carrying component to a recording medium in a transfer area while rotating in such a manner as to allow a retainer that is retaining the recording medium to pass through the recess, a transporting component configured to cause the recording medium retained by the retainer to pass through the transfer area, and a shielding component configured to shield the recess of the transferring component from colorant particles composing the colorant image.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
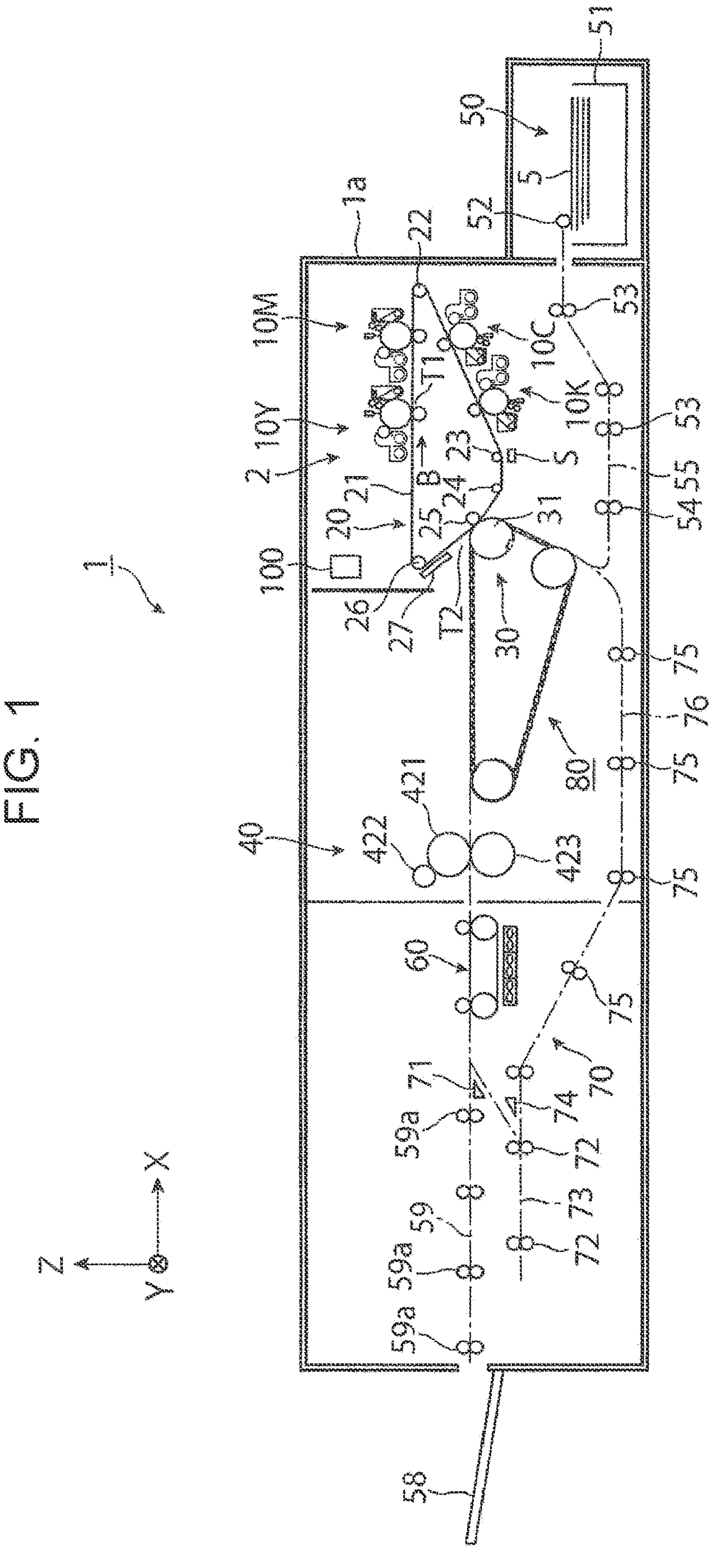
FIG. 1 illustrates an overall configuration of an image forming apparatus according to a first exemplary embodiment of the present disclosure.

FIG. 1 illustrates the entirety of an image forming apparatus 1 according to a first exemplary embodiment of the present disclosure.

Overall Configuration of Image Forming Apparatus

The image forming apparatus 1 according to the first exemplary embodiment is configured as, for example, an electrophotographic color printer. The image forming apparatus 1 has an apparatus body 1*a*, which is formed of supporting members, an exterior covering, and so forth.

The image forming apparatus 1 includes an image forming section 2. The image forming section 2 roughly includes a plurality of imaging devices 10, an intermediate transfer device 20, a sheet-feeding device 50, a sheet-transporting device 80, and a fixing device 40. The imaging devices 10 are each an exemplary image-forming component and is configured to form a toner image (colorant image) with a toner, which is an exemplary colorant included in developer. The intermediate transfer device 20 is configured to receive the toner images formed by the respective imaging devices 10 and to transport the toner images to a second-transfer position T2, where the intermediate transfer device 20 performs a second-transfer process of eventually transferring the toner images to a recording sheet 5. The sheet-feeding device 50 is configured to store predetermined recording sheets 5 and to feed out each of the recording sheets 5, which are to be transported to the second-transfer position T2 defined on the intermediate transfer device 20. The sheet-transporting device 80 is an exemplary transporting component and is configured to cause the recording sheet 5 to pass through the second-transfer position T2 defined on the intermediate transfer device 20, with the recording sheet 5 being retained by a retainer. The fixing device 40 is configured to fix the toner images transferred from the intermediate transfer device 20 to the recording sheet 5 in the second-transfer process.

The imaging devices 10 are four imaging devices 10Y, 10M, 10C, and 10K each configured to form a toner image and are respectively dedicated to four colors of yellow (Y), magenta (M), cyan (C), and black (K). The four imaging devices 10 (Y, M, C, and K) are arranged at predetermined intervals along the periphery of an intermediate transfer belt 21 in the apparatus body 1*a*.

Figure 2:
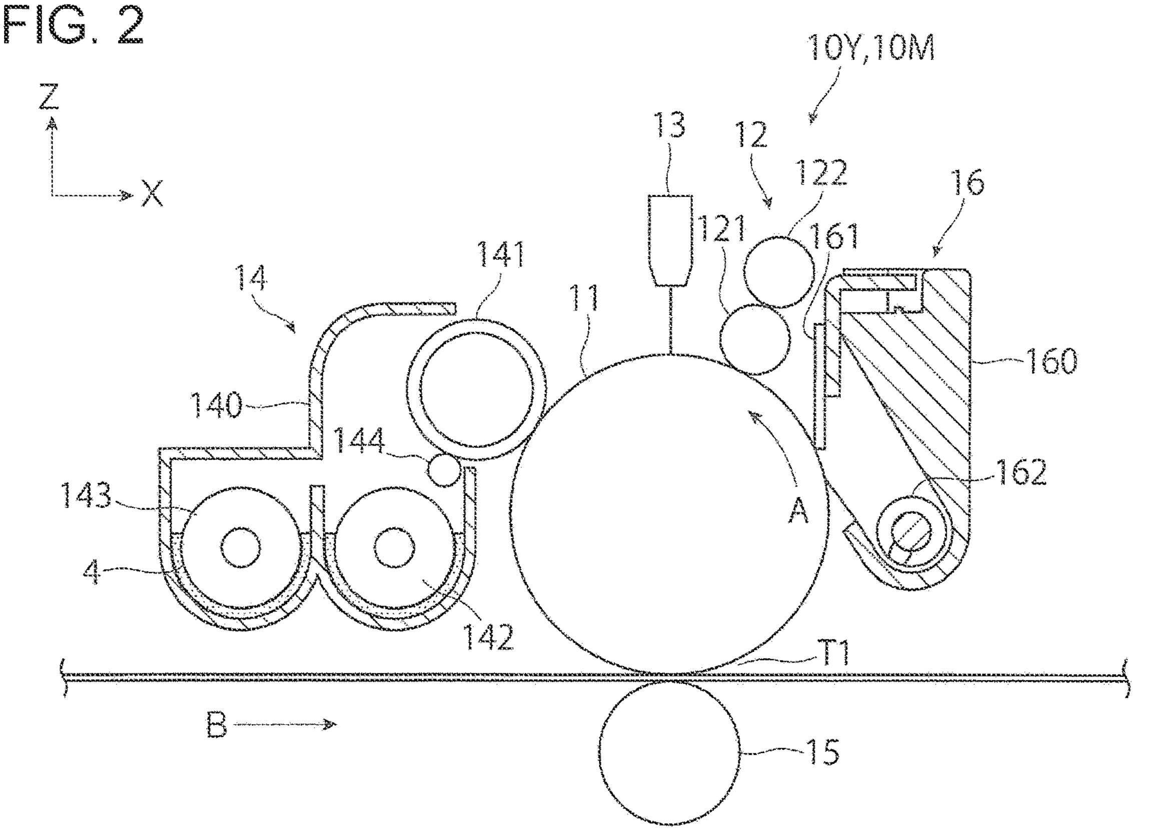
FIG. 2 illustrates an imaging device included in the image forming apparatus according to the first exemplary embodiment of the present disclosure.
Figure 3:
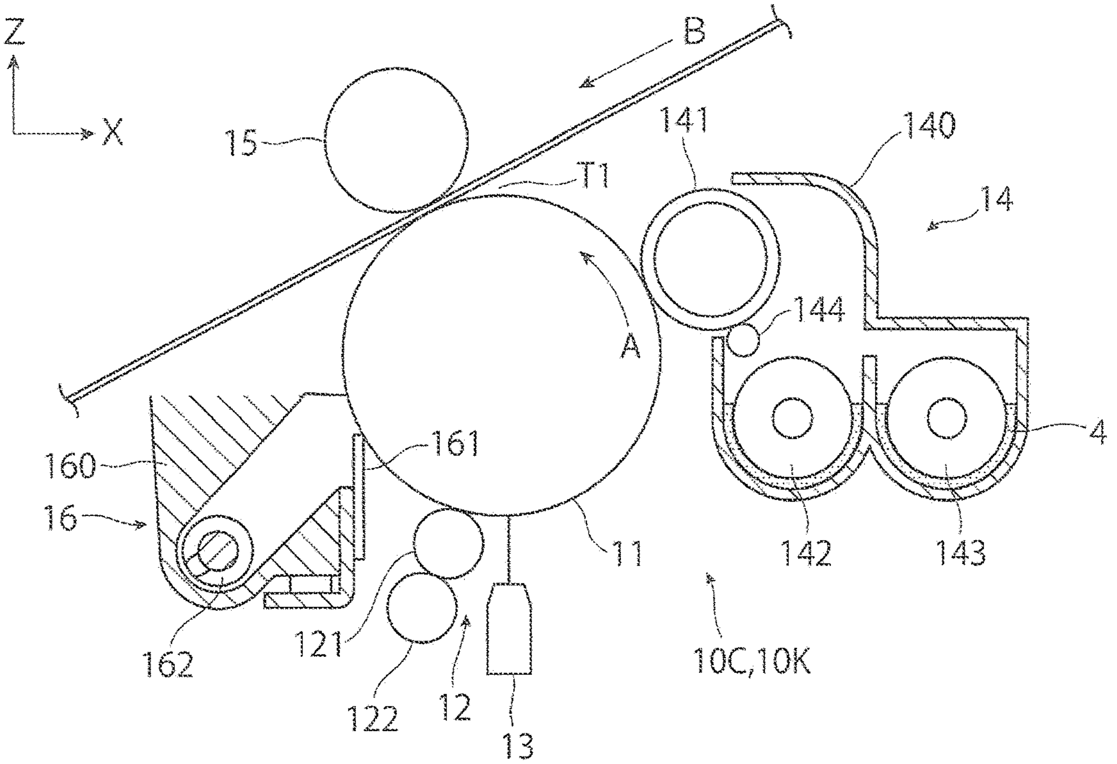
FIG. 3 illustrates another imaging device included in the image forming apparatus according to the first exemplary embodiment of the present disclosure.

Referring to FIGS. 2 and 3, each of the imaging devices 10 (Y, M, C, and K) includes a photoconductor drum 11, which is an exemplary rotatable image-carrying component and around which the following toner-image-forming components are provided, basically: a charging device 12, an exposure device 13, a developing device 14 (Y, M, C, or K), a first-transfer device 15, a drum-cleaning device 16, and so forth. The charging device 12 is configured to charge the peripheral surface (an image-carrying surface) of the photoconductor drum 11 to a predetermined potential. An image is to be formed on the peripheral surface. The exposure device 13 is an exemplary electrostatic-latent-image-forming component and is configured to apply light generated from image information (a signal) to the charged peripheral surface of the photoconductor drum 11 and thus produce a potential difference, thereby forming an electrostatic latent image (for a corresponding one of the colors). The developing device 14 (Y, M, C, or K) is an exemplary developing component and is configured to develop the electrostatic latent image into a toner image with the toner contained in the developer and having a corresponding one of the colors (Y, M, C, and K). The first-transfer device 15 is an exemplary first-transfer component and is configured to transfer the toner image to the intermediate transfer device 20 in a first-transfer process. The drum-cleaning device 16 is configured to remove residual matter, such as toner particles, from the image-carrying surface of the photoconductor drum 11 after the first-transfer process.

The photoconductor drum 11 is obtained by providing a photoconductive layer (photosensitive layer) made of a photosensitive material over the peripheral surface of a circular cylindrical or columnar base member that is to be grounded. The photoconductive layer forms the image-carrying surface. The photoconductor drum 11 is supported in such a manner as to be rotatable in a direction A when receiving a driving force transmitted from a driving device (not illustrated).

The charging device 12 includes a contact charging roller 121, which is positioned in contact with the photoconductor drum 11. The charging device 12 is supplied with a charging voltage. If the developing device 14 employs a reversal development scheme, the charging voltage to be supplied to the charging device 12 is a voltage or current of a polarity that is the same as the polarity to which the toner to be supplied from the developing device 14 is charged. The charging roller 121 is provided with a cleaning roller 122, which is positioned in contact with the back of the charging roller 121 and cleans the surface of the charging roller 121. The charging device 12 may alternatively be a noncontact charging device, such as a scorotron charger, positioned apart from the surface of the photoconductor drum 11.

The exposure device 13 is a light-emitting-diode (LED) printhead including a plurality of LEDs, which are light-emitting devices, arrayed in the axial direction of the photoconductor drum 11. The exposure device 13 is configured to form an electrostatic latent image by applying, to the photoconductor drum 11, light generated from image information inputted to the image forming apparatus 1. When the time for forming a latent image is reached, image information (a signal) inputted to the image forming apparatus 1 through a relevant device is transmitted to the exposure device 13. The exposure device 13 may alternatively be a device configured to form an electrostatic latent image by applying laser light generated from image information inputted to the image forming apparatus 1 to the charged peripheral surface of the photoconductor drum 11.

The developing device 14 (Y, M, C, or K) has a housing 140, which has an opening and storage chambers for storing developer 4. The housing 140 houses a developing roller 141, stirring-and-transporting members 142 and 143, a layer-thickness-regulating member 144, and so forth. The developing roller 141 is configured to carry the developer 4 to a developing area that faces the photoconductor drum 11. The stirring-and-transporting members 142 and 143 are screw augers or the like and are configured to cause the developer 4 to move over the developing roller 141 while stirring and transporting the developer 4. The layer-thickness-regulating member 144 is configured to regulate the amount (thickness) of the developer 4 to be carried by the developing roller 141. The developing device 14 is supplied with a developing voltage, which is placed between the developing roller 141 and the photoconductor drum 11, from a power source device (not illustrated). The developing roller 141 and the stirring-and-transporting members 142 and 143 are each configured to rotate in a predetermined direction when receiving a driving force from a driving device (not illustrated). The developer 4 (Y, M, C, or K) for each of the four colors is a two-component developer composed of a nonmagnetic toner and a magnetic carrier.

The first-transfer device 15 is a contact transfer device including a first-transfer roller that is configured to rotate while being in contact with the peripheral surface of the photoconductor drum 11 at a first-transfer position T1, with the intermediate transfer belt 21 interposed therebetween. The first-transfer roller is supplied with a first-transfer voltage. The first-transfer voltage is a direct-current voltage supplied from a power source device (not illustrated) and having a polarity opposite to the polarity to which the toner is charged.

The drum-cleaning device 16 includes a container-like body 160, a cleaning blade 161, and a delivering member 162. The cleaning blade 161 is attached to the body 160 in such a manner as to remove residual matter, such as toner particles, from the photoconductor drum 11. The delivering member 162 is a screw auger or the like and is configured to receive the matter, such as toner particles, removed by the cleaning blade 161 and to deliver the matter to a collecting system (not illustrated).

Referring to FIG. 1, the intermediate transfer device 20 is located below some of the imaging devices 10 (Y and M) and obliquely above the other imaging devices 10 (C and K). The intermediate transfer device 20 basically includes the intermediate transfer belt 21, a plurality of belt-supporting rollers 22 to 26, a second-transfer device 30, and a belt-cleaning device 27. The intermediate transfer belt 21 is an exemplary image-carrying component (intermediate transfer body) and is configured to rotate in a direction B in such a manner as to pass through the first-transfer positions T1 defined between the photoconductor drums 11 and the respective first-transfer devices 15 (first-transfer rollers). The belt-supporting rollers 22 to 26 support the intermediate transfer belt 21 from the inner peripheral side such that the intermediate transfer belt 21 is retained in a predetermined position while being allowed to rotate. The second-transfer device 30 is positioned in contact with the outer peripheral surface (an image-carrying surface) of the intermediate transfer belt 21 at a position across from the belt supporting roller 25 and is configured to transfer the toner images from the intermediate transfer belt 21 to a recording sheet 5 in the second-transfer process. The belt-cleaning device 27 is configured to remove residual matter, such as toner particles and paper lint, from the outer peripheral surface of the intermediate transfer belt 21 at a position past the second-transfer device 30.

The intermediate transfer belt 21 is an endless belt made of, for example, synthetic resin such as polyimide resin or polyamide resin in which a resistance regulator or the like such as carbon black is dispersed. The belt-supporting roller 22 serves as a driving roller. The belt-supporting roller 23 serves as a position-retaining roller that retains the position of the rotating intermediate transfer belt 21. The belt-supporting roller 24 serves as a follower roller that retains the intermediate transfer belt 21. The belt-supporting roller 25 serves as a backup roller for the second-transfer process. The belt-supporting roller 26 serves as a position-retaining roller that retains the position of the rotating intermediate transfer belt 21 and as a supporting roller for the belt-cleaning device 27.

Figure 4:
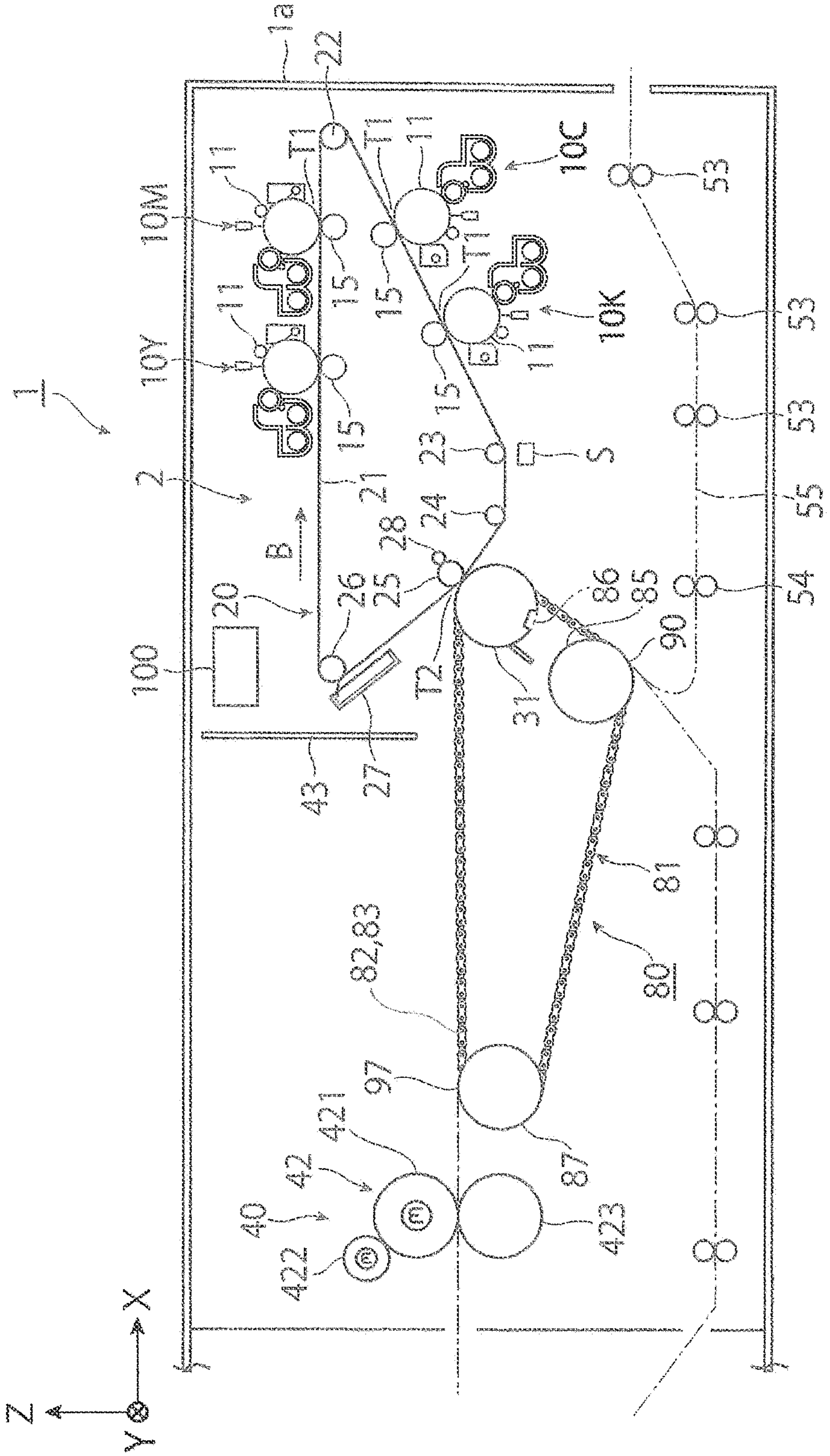
FIG. 4 illustrates a sheet-transporting device included in the image forming apparatus according to the first exemplary embodiment of the present disclosure.

Referring to FIG. 4, the second-transfer device 30 includes a second-transfer roller 31. The second-transfer roller 31 serves as a transferring body configured to rotate at the second-transfer position T2 defined on the outer peripheral surface of the intermediate transfer belt 21 and where the intermediate transfer belt 21 is supported by the belt-supporting roller 25 of the second-transfer device 20. The second-transfer roller 31 or the belt supporting roller 25 of the intermediate transfer device 20 is supplied with a direct-current second-transfer voltage that has a polarity opposite to or the same as the polarity to which the toners are charged. In the first exemplary embodiment, for example, a direct-current voltage having a polarity the same as the polarity of the toner is supplied as a second-transfer voltage from a high-voltage power source device (not illustrated) to the belt-supporting roller 25 through a voltage-applying roller 28. The second-transfer roller 31 is grounded.

The fixing device 40 includes a fixing unit 42. The fixing unit 42 includes heating rotary members 421 and 422 and a pressing rotary member 423. The part where the heating rotary member 421 and the pressing rotary member 423 are in contact with each other forms a fixing nip, where the toner images on the recording sheet 5 are to be fixed. The heating rotary member 422 is in contact with the outer peripheral surface of the heating rotary member 421, thereby heating the surface of the heating rotary member 421 from the outside. Between the fixing device 40 and the intermediate transfer device 20 of the image forming section 2 is provided a heat-shielding plate 43, which shields the intermediate transfer device 20 and other relevant elements from the heat radiated from the fixing device 40.

Referring to FIG. 1, the sheet-feeding device 50 is located obliquely below the intermediate transfer device 20. The sheet-feeding device 50 basically includes a plurality of sheet storages 51 (or a single sheet storage 51) and a delivering device 52. The sheet storages 51 each store a stack of recording sheets 5 that are of one predetermined size, kind, or the like. The delivering device 52 is configured to deliver the recording sheets 5 one by one from any of the sheet storages 51. The sheet storages 51 are drawable from, for example, the front face of the apparatus body 1*a* (a lateral face toward which the user who is operating the apparatus 1 faces).

Examples of the recording sheet 5 include thin papers, such as plain paper and tracing paper, intended for electrophotographic machines such as copiers and printers; and transparent film media made of synthetic resins (polyethylene terephthalate (PET) and the like), such as sheets intended for over-head projectors (OHPs). The surface smoothness of the fixed image may be improved by using a recording sheet 5 having a highly smooth surface, for example, coated paper obtained by coating plain paper with resin or the like; or thick paper, such as paper for printing art, having a relatively heavy basis weight.

The sheet-feeding device 50 and the second-transfer device 30 are connected to each other with a sheet-feeding path 55. The sheet-feeding path 55 is provided with a plurality of pairs (or a single pair) of sheet-transporting rollers 53 and 54 and transporting guides (not illustrated), with which the recording sheet 5 fed from the sheet-feeding device 50 is transported to the second-transfer position T2. The second-transfer position T2 is an exemplary transfer area. The pair of sheet-transporting rollers 54 is located next to the second-transfer position T2 on the upstream side in the sheet-feeding path 55 and serves as, for example, a pair of rollers (registration rollers) that adjusts the timing of transporting the recording sheet 5. In the first exemplary embodiment, as to be described below, the sheet-transporting device 80 includes a chain gripper 81. The chain gripper 81 is configured to accurately adjust the timing of transporting the recording sheet 5 and the orientation of the recording sheet 5 that is being transported. Therefore, the pair of sheet-transporting rollers 54 located immediately before the second-transfer position T2 may be a component that simply transports the recording sheet 5 to a retaining position 90, which is defined on the chain gripper 81.

Between the second-transfer device 30 and the fixing device 40 is provided the sheet-transporting device 80. The sheet-transporting device 80 is an exemplary transporting component and is configured to cause the recording sheet 5, fed from the sheet-feeding device 50, to pass through the second-transfer position T2 with the recording sheet 5 being retained by a retainer. The second-transfer position T2 is the position where the second-transfer roller 31 meets the intermediate transfer belt 21. Details of the sheet-transporting device 80 will be described separately below.

Figure 5:
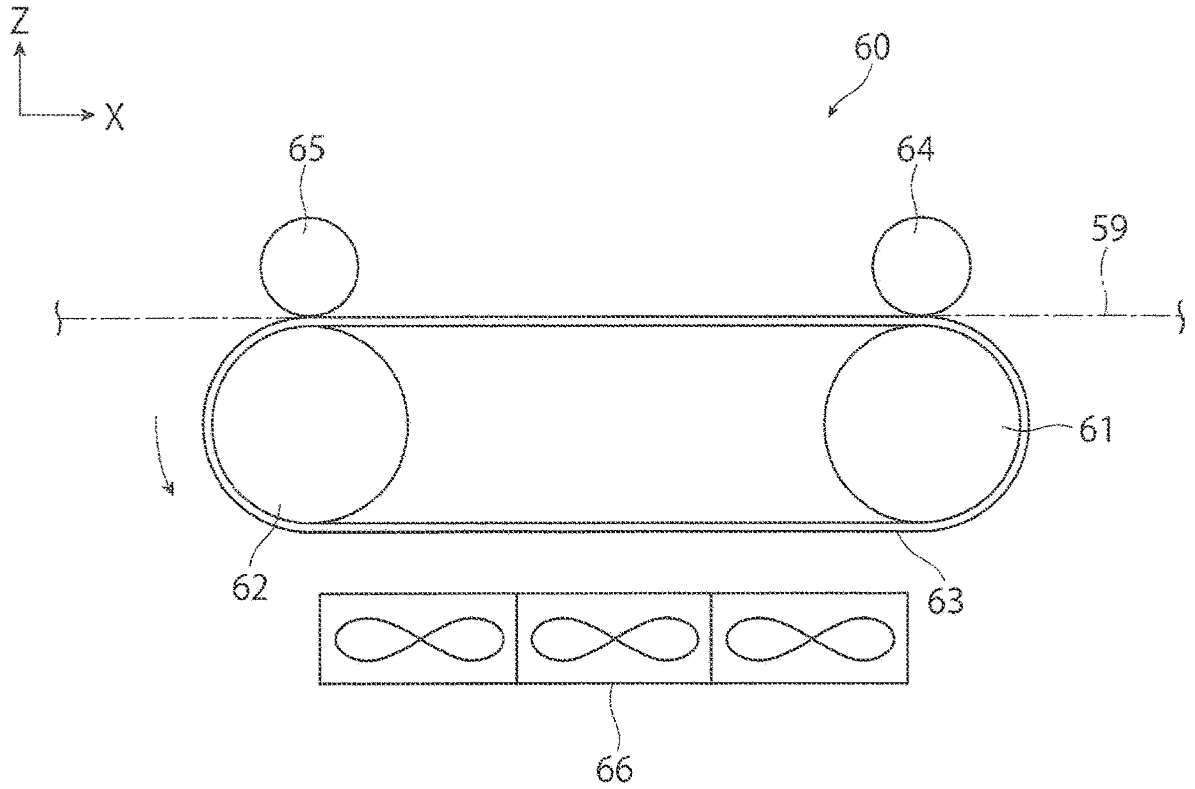
FIG. 5 illustrates a cooling device.

On the downstream side with respect to the fixing device 40 are provided a cooling device 60 and an outputting transport path 59. The cooling device 60 is configured to cool the recording sheet 5 having the toner images fixed by the fixing device 40. The outputting transport path 59 is provided with sheet-outputting rollers 59*a*, with which the recording sheet 5 having the toner images fixed by the fixing device 40 is outputted to a sheet-receiving member 58, which is provided on a lateral face (the left face) of the apparatus body 1*a*. Referring to FIG. 5, the cooling device 60 includes an air-permeable transporting belt 63, transporting rollers 64 and 65, and a cooling fan 66. The transporting belt 63 is stretched between a driving roller 61 and a follower roller 62 and cooperates with the transporting rollers 64 and 65 to transport the recording sheet 5. The cooling fan 66 is configured to cool the recording sheet 5 on the transporting belt 63 by sending air toward the back side of the recording sheet 5 through the transporting belt 63.

Referring to FIG. 1, the image forming apparatus 1 further includes a duplex transport section 70, which is used in forming images on two respective sides of the recording sheet 5. In the duplex transport section 70, the direction of transport of the recording sheet 5, having an image on one side thereof, is changed by a first switching gate 71 obliquely downward to a reversal transport path 73, which is provided with pairs of reversing rollers 72. When the recording sheet 5 is transported into the reversal transport path 73, the direction of rotation of the pairs of reversing rollers 72 is reversed. Furthermore, a second switching gate 74 operates to change the direction of transport of the recording sheet 5 (hereinafter referred to as "sheet-transporting direction") toward a duplex transport path 76, which is provided with a plurality of pairs of duplex transport rollers 75. Thus, in the duplex transport section 70, the recording sheet 5 having an image on one side thereof and whose front and back sides are reversed is transported along the duplex transport path 76 provided with the plurality of pairs of duplex transport rollers 75 to the sheet-feeding path 55 again.

As illustrated in FIG. 1, the image forming apparatus 1 includes a control device 100, which is an exemplary controller and generally controls the operation of the image forming apparatus 1. The control device 100 includes a central processing unit (CPU), a read-only memory (ROM), a random access memory (RAM), buses connecting the foregoing to one another, and a communication interface, all of which are not illustrated.

Basic Operation of Image Forming Apparatus

A basic image forming operation performed by the image forming apparatus 1 will now be described.

The following description relates to an image forming operation in which a full-color image composed of toner images having the four respective colors (Y, M, C, and K) is formed by using the four imaging devices 10 (Y, M, C, and K). Basically, the following description also applies to another image forming operation in which an image composed of one or more toner images having respective colors is formed by using a corresponding one or more of the four imaging devices 10 (Y, M, C, and K).

Referring to FIG. 1, when the image forming apparatus 1 receives a command that requests an image forming operation (printing operation), the control device 100 activates the four imaging devices 10 (Y, M, C, and K), the intermediate transfer device 20, the second-transfer device 30, the fixing device 40, and other relevant devices.

In the imaging devices 10 (Y, M, C, and K), the photoconductor drums 11 first rotate in the direction A (see FIGS. 2 and 3), and the charging devices 12 charge the surfaces of the photoconductor drums 11 to a predetermined potential of a predetermined polarity (negative polarity, in the first exemplary embodiment). Subsequently, the exposure devices 13 generate light beams from image signals obtained through the conversion of image information inputted to the image forming apparatus 1 into pieces of information on the respective color components (Y, M, C, and K), and apply the light beams to the charged surfaces of the photoconductor drums 11, whereby electrostatic latent images for the respective color components are formed as a predetermined potential difference produced on the surfaces of the photoconductor drums 11.

Subsequently, in the developing devices 14 (Y, M, C, and K), the toners having the respective colors (Y, M, C, and K) and charged to the predetermined polarity (negative polarity) are supplied to the electrostatic latent images for the respective color components on the photoconductor drums 11, whereby the electrostatic latent images are developed with the toners that are electrostatically attracted thereto. Thus, the electrostatic latent images for the respective color components on the photoconductor drums 11 are visualized with the toners having the respective colors into toner images in the four respective colors (Y, M, C, and K).

The toner images in the respective colors on the photoconductor drums 11 of the imaging devices 10 (Y, M, C, and K) are transported to the respective first-transfer positions T1, where the first-transfer devices 15 perform the first-transfer process in which the toner images in the respective colors are sequentially superposed one on top of another on the intermediate transfer belt 21 of the intermediate transfer device 20 that is rotating in the direction B.

In the imaging devices 10 (Y, M, C, and K) having completed the first-transfer process, the drum cleaning devices 16 clean the surfaces of the photoconductor drums 11 by scraping off residual matter from the photoconductor drums 11. Thus, the imaging devices 10 (Y, M, C, and K) are ready for the next imaging operation.

Subsequently, in the intermediate transfer device 20, the intermediate transfer belt 21 carrying the set of toner images transferred thereto in the first-transfer process rotates to transport the set of toner images to the second-transfer position T2. Meanwhile, in the sheet-feeding device 50, a predetermined recording sheet 5 is fed into the sheet-feeding path 55 synchronously with the imaging operation. In the sheet-feeding path 55, the pair of sheet-transporting rollers 54 serving as a pair of registration rollers supplies the recording sheet 5 toward the second-transfer position T2 synchronously with the timing of transfer. Then, the sheet-transporting device 80 transports the recording sheet 5 to the second-transfer position T2.

At the second-transfer position T2, the second-transfer roller 31 serving as a transferring body performs the second-transfer process in which the set of toner images is transferred from the intermediate transfer belt 21 to the recording sheet 5. In the intermediate transfer device 20 having completed the second-transfer process, the belt cleaning device 27 removes residual matter, such as toner particles, from the surface of the intermediate transfer belt 21 having undergone the second-transfer process.

Subsequently, the recording sheet 5 now having the set of toner images received in the second-transfer process is released from the intermediate transfer belt 21 and from the second-transfer roller 31, and is transported to the fixing device 40 by the sheet-transporting device 80. In the fixing device 40, the recording sheet 5 having undergone the second-transfer process is made to pass through the fixing nip defined in the fixing unit 42 between the heating rotary member 421 and the pressing rotary member 423 that are rotating. Thus, the set of toner images yet to be unset on the recording sheet 5 undergoes a predetermined fixing process (heating and pressing) to be fixed to the recording sheet 5. The recording sheet 5 having undergone the fixing process is cooled by the cooling device 60, is transported by the sheet-outputting rollers 59*a* along the outputting transport path 59, and is outputted onto the sheet-receiving member 58 provided on the left face of the apparatus body 1*a* of the image forming apparatus 1.

To form images on both sides of the recording sheet 5, before the recording sheet 5 having an image formed on one side thereof is outputted to the sheet-receiving member 58 by the sheet-outputting rollers 59*a*, the first switching gate 71 operates to change the transport path for the recording sheet 5, having passed through the cooling device 60, to the reversal transport path 73. Thus, the recording sheet 5 is introduced into the reversal transport path 73, where the direction of rotation of the pairs of reversing rollers 72 is reversed, and the second switching gate 74 introduces the recording sheet 5 into the duplex transport section 70. The recording sheet 5 whose front and back sides have thus been reversed is then transported along the duplex transport path 76 provided with the pairs of duplex transport rollers 75 to the sheet-feeding path 55 again. The pair of sheet-transporting rollers 54 provided on the sheet-feeding path 55 supplies the recording sheet 5 to the sheet-transporting device 80 synchronously with the timing of transfer, and the sheet-transporting device 80 transports the recording sheet 5 to the second-transfer position T2. The recording sheet 5 then receives at the back side (a second side) thereof another set of toner images from the intermediate transfer belt 21 in the second-transfer process, undergoes the fixing process in the fixing device 40, is cooled by the cooling device 60, and is outputted, with a first side thereof facing down, by the sheet-outputting rollers 59*a* onto the sheet-receiving member 58 provided on the lateral face of the apparatus body 1*a*.

Through the above series of processes, a recording sheet 5 having a full-color image formed as a combination of toner images in the four respective colors, is outputted.

Configuration of Sheet-Transporting Device

In the image forming apparatus 1 according to the first exemplary embodiment, as described above, the pair of sheet-transporting rollers 54 supplies the recording sheet 5 fed from the sheet-feeding device 50 to the sheet-transporting device 80, and the sheet-transporting device 80 transports the recording sheet 5 to the second-transfer position T2.

In this process, the pair of sheet-transporting rollers 54 serving a pair of registration rollers stops rotating, whereby the leading end of the recording sheet 5 is made to knock against the nip between the pair of sheet-transporting rollers 54. Thus, the recording sheet 5 is registered such that the leading end thereof extending in a direction intersecting the sheet-transporting direction extends parallel to the axial direction of the pair of sheet-transporting rollers 54.

The sheet-transporting device 80 of the image forming apparatus 1 according to the first exemplary embodiment is an exemplary transporting component and includes the chain gripper 81. The chain gripper 81 is configured to transport the recording sheet 5 from the second-transfer device 30 to the fixing device 40 in such a manner as to cause the recording sheet 5 to pass through the second-transfer position T2 with the leading end of the recording sheet 5 being retained a retainer.

Figure 6:
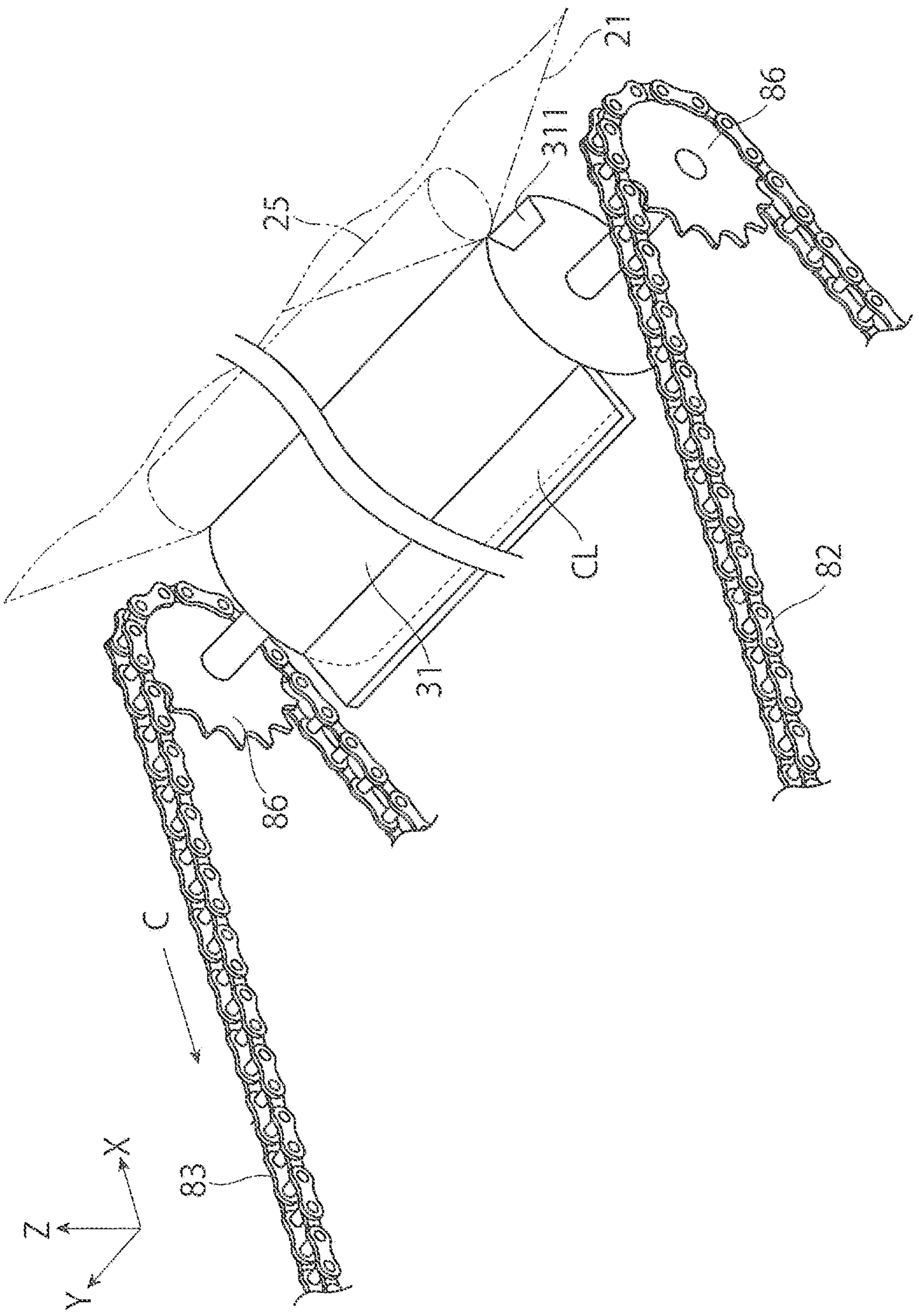
FIG. 6 is a perspective view of the sheet-transporting device included in the image forming apparatus according to the first exemplary embodiment of the present disclosure.
Figure 7:
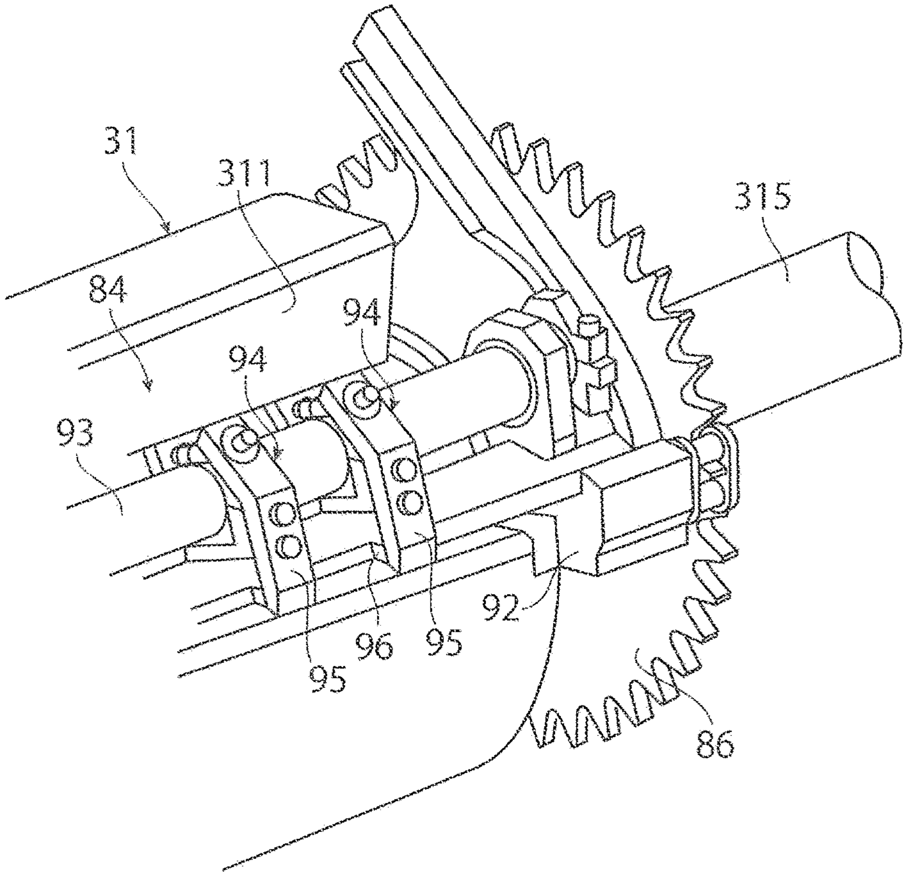
FIG. 7 is a perspective view of a second-transfer roller.
Figure 8:
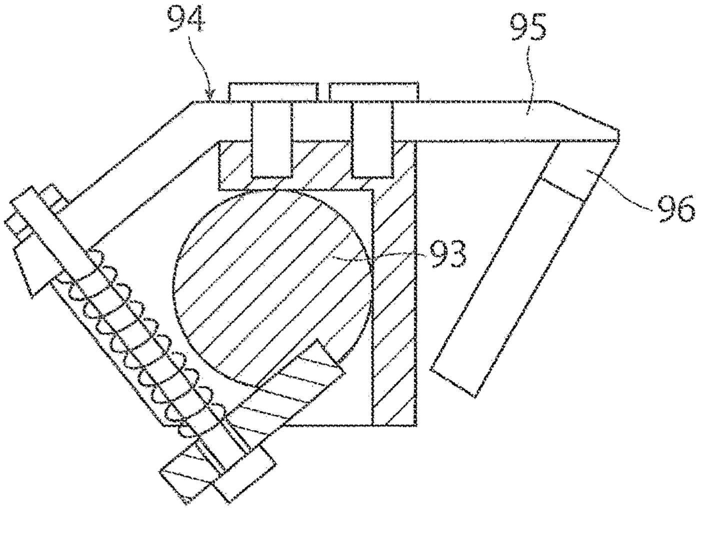
FIG. 8 is a sectional view of a gripping unit included in a chain gripper.

Referring to FIGS. 4, 6, and 7, the chain gripper 81 includes a pair of chains 82 and 83, a plurality of gripping units 84, and a plurality of pairs of sprocket wheels 85 to 87. The pair of chains 82 and 83 are located on the front and rear sides, respectively, of the transport path for the recording sheet 5. The gripping units 84 are exemplary retainers and are each connected to the pair of chains 82 and 83 in such a manner as to extend in a direction intersecting a moving direction C, in which the chains 82 and 83 move. The gripping units 84 are each configured to retain the leading end of the recording sheet 5. The pairs of sprocket wheels 85 to 87 are configured to cause the pair of chains 82 and 83 to rotate on a predetermined locus. The plurality (two or three, for example) of gripping units 84 on the chains 82 and 83 are arranged at predetermined intervals in the moving direction C of the chains 82 and 83.

As illustrated in FIGS. 4 and 6, the pair of chains 82 and 83 are located on the two respective outer sides with respect to the recording sheet 5 in a front-to-rear direction Y, which intersects the moving direction C. The pair of chains 82 and 83 are supported by the pair of sprocket wheels 85, the pair of sprocket wheels 86, and the pair of sprocket wheels 87 in such a manner as to be rotatable therearound at a predetermined speed. The pair of sprocket wheels 85 are located at the retaining position 90 and on the two respective sides in the front-to-rear direction Y. At the retaining position 90, the leading end, 5*a*, of the recording sheet 5 is to be retained. The pair of sprocket wheels 86 are located at the two respective axial ends of the second-transfer roller 31. The pair of sprocket wheels 87 are located at a releasing position 97 and on the two respective sides in the front-to-rear direction Y. The releasing position 97 is defined on the upstream side with respect to the fixing device 40. Among the plurality of pairs of sprocket wheels 85 to 87, for example, the pair of sprocket wheels 86 located at the two respective axial ends of the second-transfer roller 31 are driven by a driving device (not illustrated) to rotate at a predetermined speed. The recording sheet 5 that is released at the releasing position 97 is transported to the fixing device 40 with a transporting force exerted by the second-transfer roller 31, with the back side of the recording sheet 5 being supported.

Figure 9:
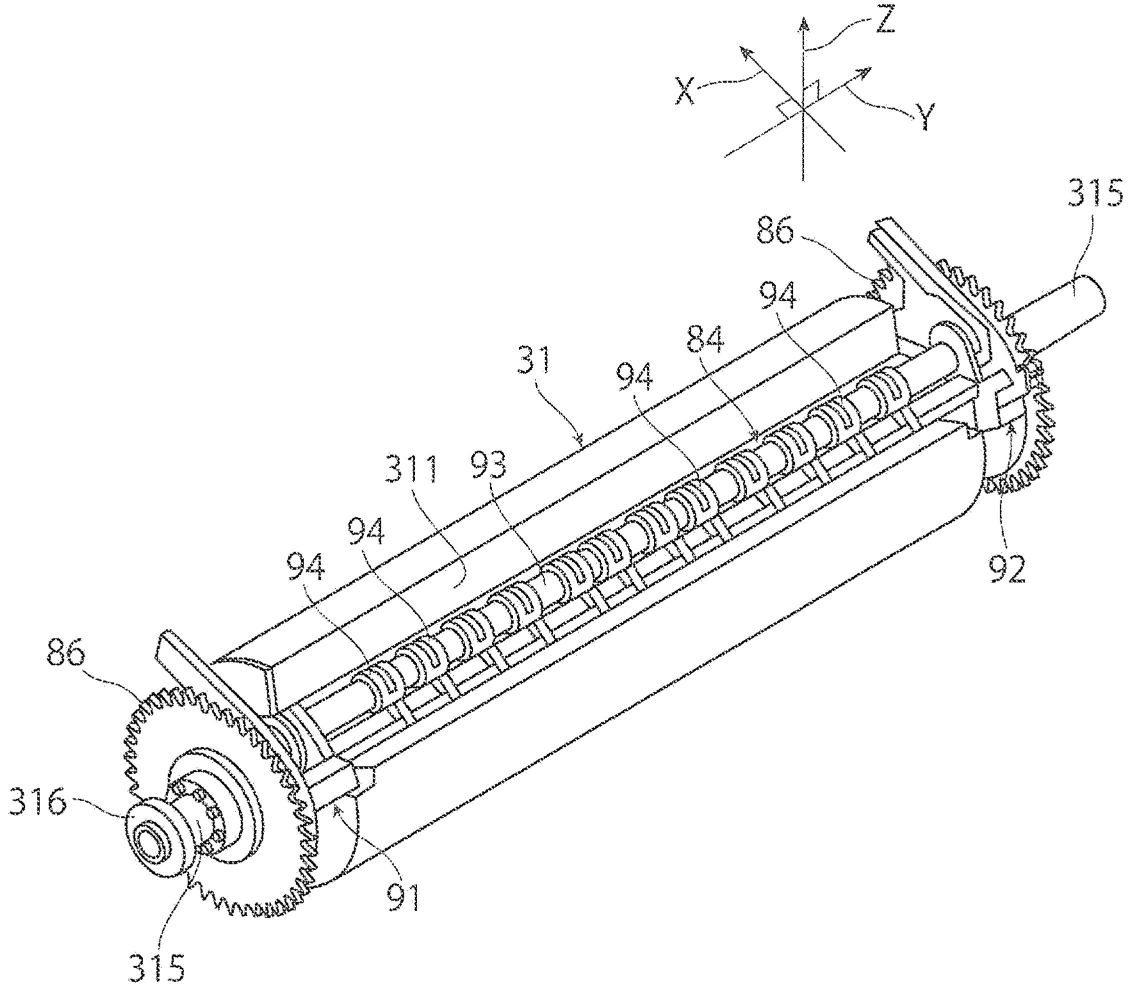
FIG. 9 is another perspective view of the second-transfer roller.

Referring to FIGS. 7 and 9, the gripping units 84 are each attached at the two longitudinal ends thereof to the respective chains 82 and 83 with the aid of respective attaching members 91 and 92. Thus, the gripping units 84 rotate together with the pair or chains 82 and 83 in the moving direction C while maintaining a predetermined orientation thereof. Each gripping unit 84 includes a plurality (twelve in the illustrated case) of catching members 94, and a catch-bearing member 96. The catching members 94 are fixed to a driving shaft 93, which is rotatably supported by the attaching members 91 and 92. The catching members 94 are arranged at predetermined intervals in the axial direction of the driving shaft 93. The catching members 94 have at the distal ends thereof respective catches 95. The catches 95 are to come into contact with the catch-bearing member 96, whereby the leading end 5*a* of the recording sheet 5 is retained (gripped). When the catching members 94 of one of the gripping units 84 reach the retaining position 90 where the recording sheet 5 is to be retained or the releasing position 97 where the recording sheet 5 is about to enter the fixing device 40, the catching members 94 are opened and are closed with the rotation of the driving shaft 93 that is driven by a cam member (not illustrated) serving as an exemplary opening-and-closing member. Thus, the leading end 5*a* of the recording sheet 5 is retained or released.

As illustrated in FIG. 9, the plurality of catching members 94 included in each of the gripping units 84 are arranged in a straight line in a direction intersecting the sheet-transporting direction. The gripping units 84 are carried by the pair of chains 82 and 83 in such a manner as to circulate in the moving direction C while maintaining a predetermined orientation thereof. Thus, the chain gripper 81 transports the recording sheet 5 in the sheet-transporting direction while accurately maintaining the orientation of the recording sheet 5 by retaining the leading end 5*a* of the recording sheet 5 with the catching members 94 included in a relevant one of the gripping units 84 and are arranged in a direction intersecting the sheet-transporting direction.

Referring to FIG. 4, the chain gripper 81 retains the leading end 5*a* of the recording sheet 5 by using one of the gripping units 84, and transports the recording sheet 5 from the retaining position 90 to the releasing position 97 along a predetermined transport path with the chains 82 and 83 being rotated by the sprocket wheels 85 to 87.

Referring to FIG. 6, when the recording sheet 5 whose leading end 5*a* is retained by the chain gripper 81 passes through the second-transfer position T2, the recording sheet 5 is nipped by the second-transfer roller 31 and the belt-supporting roller 25. Therefore, the second-transfer roller 31 has a recess 311. When one of the gripping units 84 of the chain gripper 81 that is retaining the recording sheet 5 moves around the second-transfer roller 31, the recess 311 receives the gripping unit 84.

Figure 10:
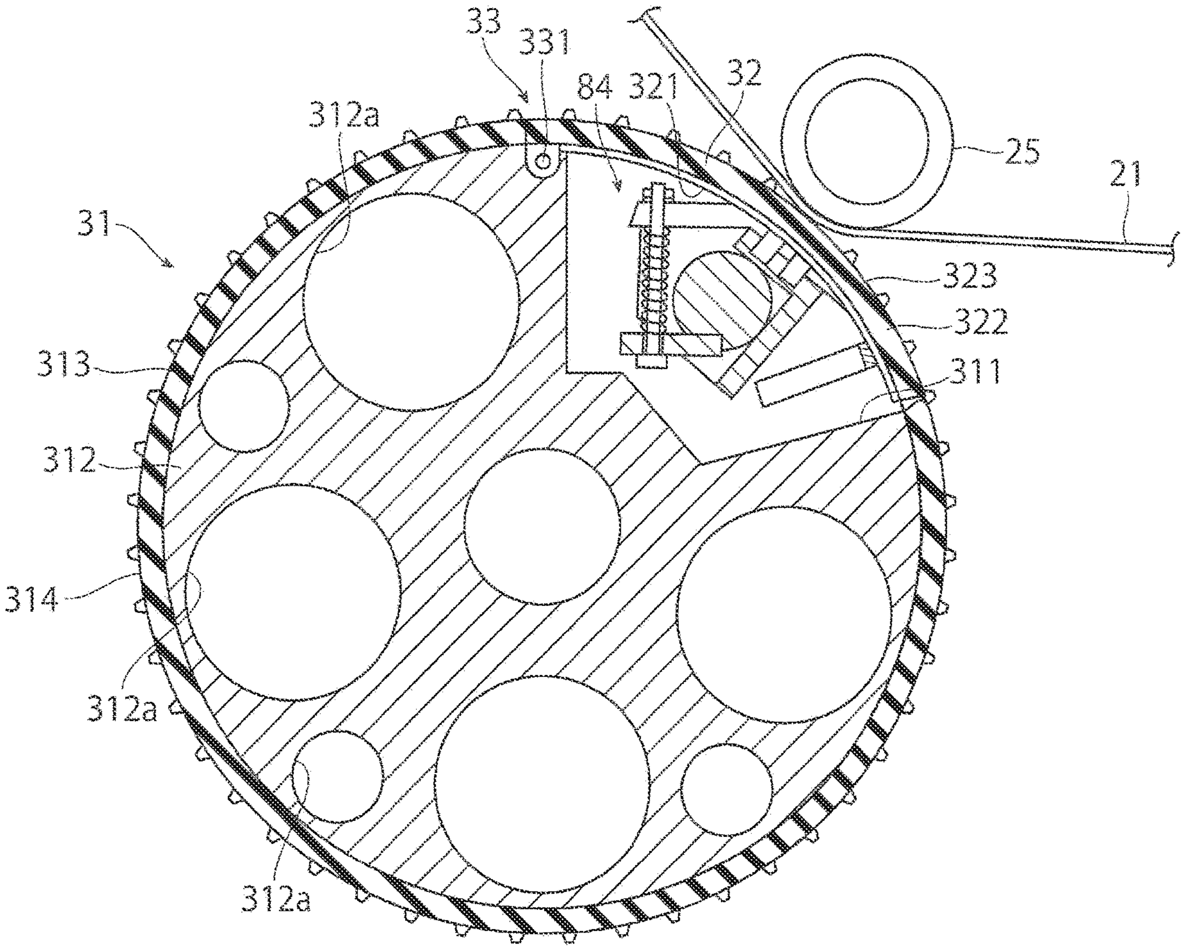
FIG. 10 is a sectional view of the second-transfer roller.

Referring to FIGS. 9 and 10, the second-transfer roller 31 includes a second-transfer-roller body 312, an elastic layer 313, and a releasing layer 314. The second-transfer-roller body 312 is made of metal such as stainless steel or aluminum, an electrically conductive synthetic resin, or the like and has a circular columnar or cylindrical shape. The elastic layer 313 is provided over the second-transfer-roller body 312 and is made of silicone rubber, fluororubber, or the like. The releasing layer 314 is a thin layer of perfluoroalkoxy alkane (PFA), polytetrafluoroethylene (PTFE), or the like that is provided over the elastic layer 313. The second-transfer-roller body 312 has a plurality of hollows 312*a*, whereby the weight thereof is reduced while the strength thereof is maintained. The hollows 312*a* have circular sectional shapes with different diameters. The plurality of hollows 312*a* are arranged substantially in axial symmetry so that the moment of rotation of the second-transfer roller 31 is substantially constant. The releasing layer 314 may be obtained either by deposition of a thin layer on the elastic layer 313 or by forming a film and providing the film over the elastic layer 313.

Figure 11:
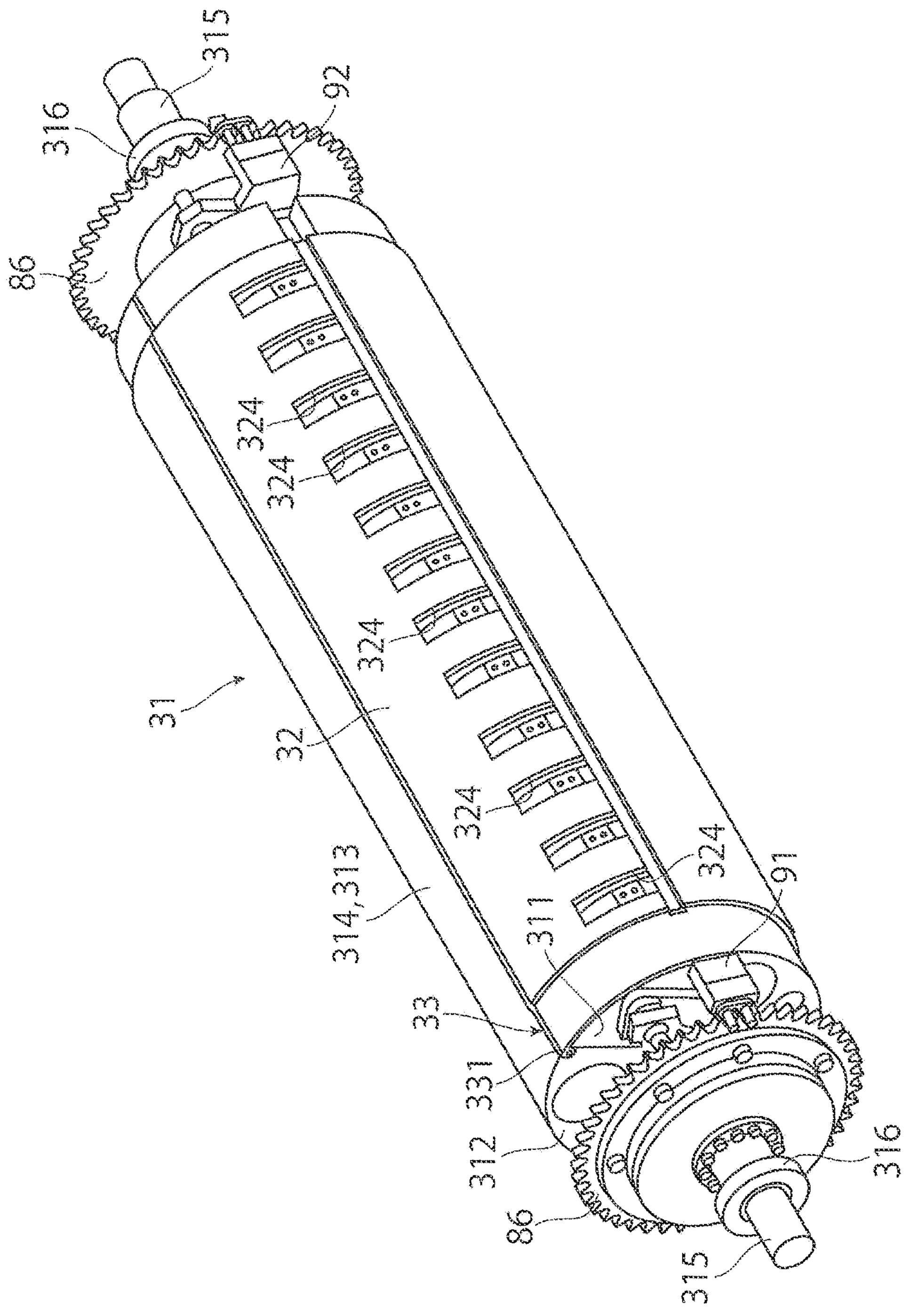
FIG. 11 is yet another perspective view of the second-transfer roller.

Referring to FIGS. 9 and 11, the second-transfer roller 31 has two rotary shafts 315, which are provided at the two respective axial ends of the second-transfer-roller body 312 and are supported by respective bearing members 316, whereby the second-transfer roller 31 is rotatable. Referring to FIG. 6, the second-transfer roller 31 is provided with a roller-cleaning device CL. The roller-cleaning device CL is a cleaning blade, a cleaning brush, or the like and cleans the surface of the second-transfer roller 31.

Referring to FIG. 10, the recess 311 provided in the second-transfer roller 31 is a depression having a substantially rectangular sectional shape with a predetermined length in the peripheral direction on the surface of the second-transfer roller 31 and a predetermined depth substantially in the radial direction of the second-transfer roller 31. The recess 311 extends from end to end in the axial direction of the second-transfer roller 31 such that the two ends of the recess 311 are open.

The recess 311 of the second-transfer roller 31 that is of a substantially rectangular sectional shape has a length greater than the length of each of the gripping units 84 in the peripheral direction and a depth greater than the height of each of the gripping units 84 so that each of the gripping units 84 of the chain gripper 81 is housed in the recess 311 without coming into contact with the walls of the recess 311 and without projecting from the outer peripheral surface of the second-transfer roller 31.

The gripping units 84 of the chain gripper 81 move together with the pair of chains 82 and 83 along the predetermined transport path. Factors including the positions of the gripping units 84 of the chain gripper 81 on the pair of chains 82 and 83 are determined such that the gripping units 84 that move around the second-transfer roller 31 sequentially face the recess 311 of the second-transfer roller 31.

In the image forming apparatus 1 configured as above, as illustrated in FIG. 6, the second-transfer roller 31 has the recess 311 in the outer peripheral surface thereof. Hence, when the recess 311 of the second-transfer roller 31 passes through the second-transfer position T2 where the second-transfer roller 31 meets the intermediate transfer belt 21, some particles of the toners composing the toner images on the intermediate transfer belt 21 may drop into or adhere to the recess 311 to accumulate therein, contaminating the recording sheet 5 and relevant elements in the apparatus body 1*a* of the image forming apparatus 1.

Therefore, the image forming apparatus 1 according to the first exemplary embodiment includes a covering member 32. The covering member 32 is an exemplary shielding component configured to shield the recess 311 of the second-transfer roller 31 from particles of the colorants composing the toner images.

Referring to FIG. 10, the covering member 32 is provided over the recess 311 of the second-transfer roller 31 with a hinge 33, which serves as a fulcrum and about which the covering member 32 is openable. The hinge 33 is located at one end of the recess 311 in the peripheral direction: the downstream end of the recess 311 in the direction of rotation of the second-transfer roller 31. The covering member 32 includes a base plate 321, an elastic layer 322, and a releasing layer 323. The base plate 321 is made of metal and has an arc shape with a curvature radius that is equal to the curvature radius of the second-transfer-roller body 312 of the second-transfer roller 31. The elastic layer 322 is provided over the outer peripheral surface of the base plate 321 and is made of silicone rubber, fluororubber, or the like. The releasing layer 323 is a thin layer of PFA, PTFE, or the like that is provided over the elastic layer 322.

As illustrated in FIGS. 10 and 11, the covering member 32 is attached to the second-transfer-roller body 312 with the aid of a rotary shaft 331, which is fixedly provided at an end of the base plate 321. Thus, the covering member 32 is openable about the rotary shaft 331. The covering member 32 is opened at the retaining position 90 by a predetermined angle with the aid of a cam member (not illustrated) provided at one axial end or each of the two axial ends of the rotary shaft 331. The covering member 32 has cuts 324, which are provided at positions that are to coincide with the respective catching members 94, whereby the interference between the covering member 32 and the catching members 94 of each of the gripping units 84 is avoided.

Figure 12:
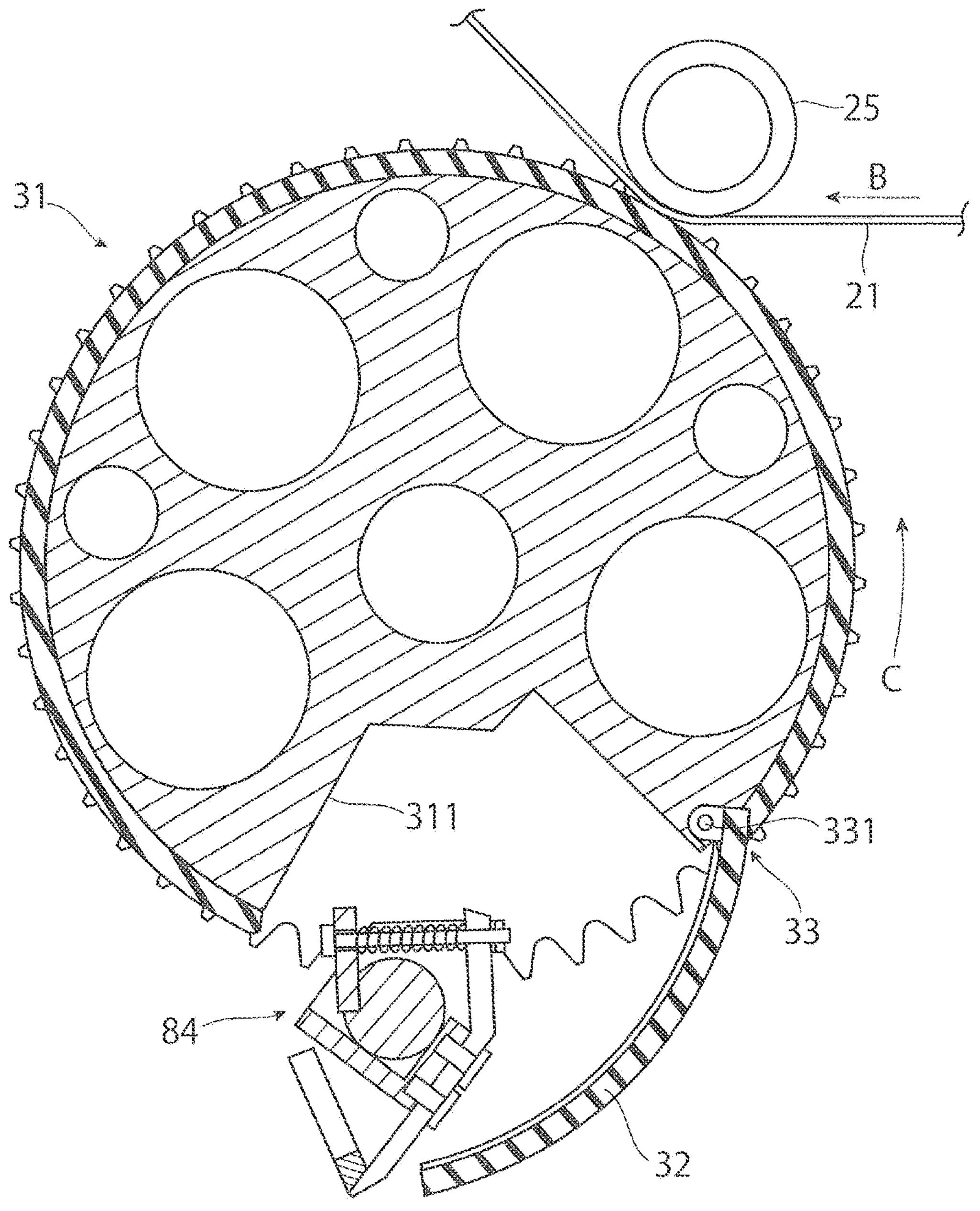
FIG. 12 illustrates how the image forming apparatus according to the first exemplary embodiment of the present disclosure works in sectional view.

More specifically, referring to FIG. 12, the covering member 32 is opened and is closed with respective predetermined timings during a period over which a relevant one of the gripping units 84 carried by and circulating with the pair of chains 82 and 83 moves from the pair of sprocket wheels 85 to the pair of sprocket wheels 86 provided at the two respective axial ends of the second-transfer roller 31. Thus, the relevant gripping unit 84 on the pair of chains 82 and 83 goes into the recess 311 of the second-transfer roller 31. In this process, the covering member 32 is driven to be opened and closed in such a manner as not to interfere with the gripping unit 84.

Figure 13:
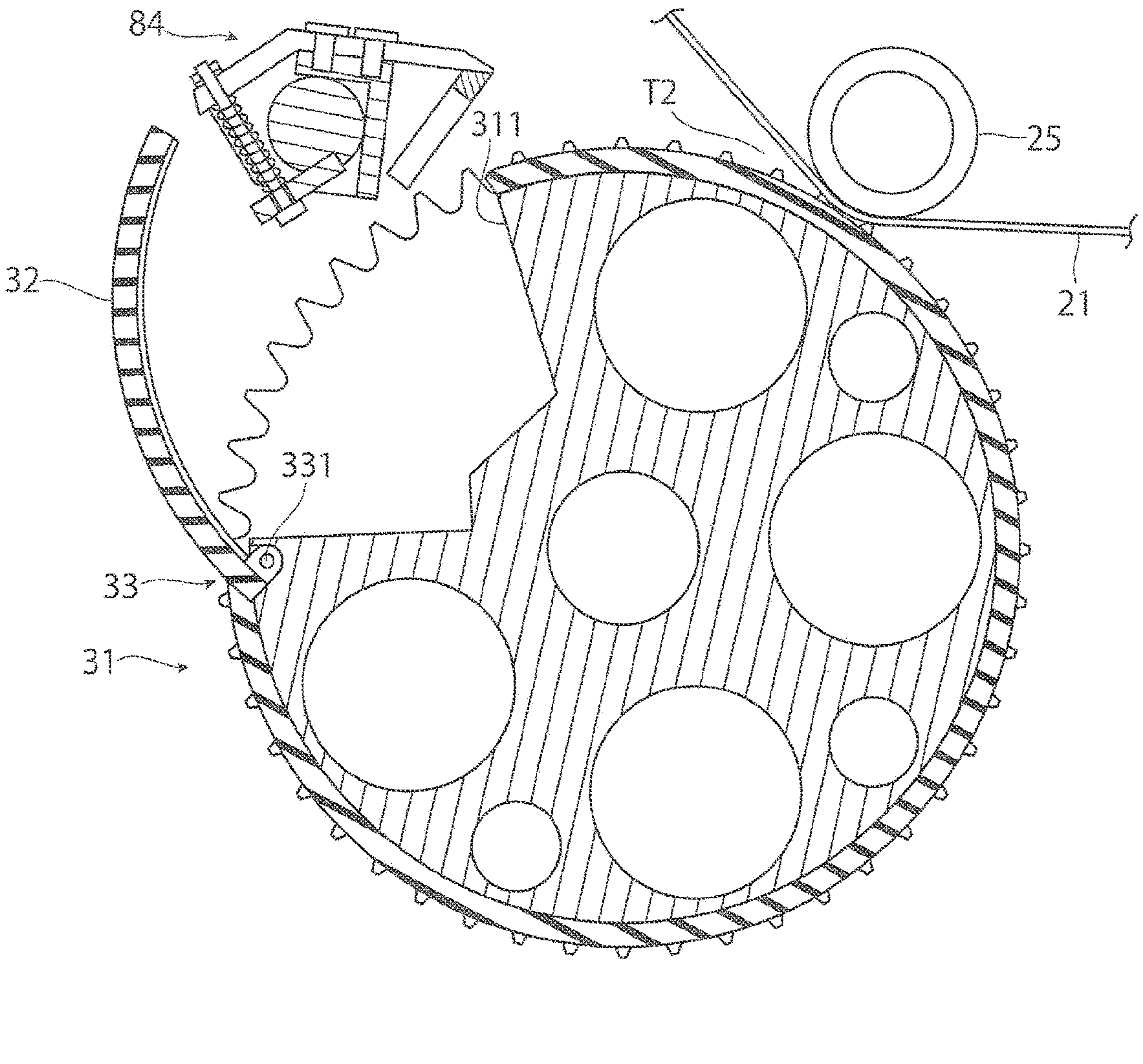
FIG. 13 also illustrates how the image forming apparatus according to the first exemplary embodiment of the present disclosure works in sectional view.

Referring to FIG. 13, the covering member 32 is opened and is closed with respective predetermined timings after the gripping unit 84 passes through the second-transfer position T2. Thus, the gripping unit 84 on the pair of chains 82 and 83 goes out of the recess 311 of the second-transfer roller 31. In this process, the covering member 32 is driven to be opened and closed in such a manner as not to interfere with the gripping unit 84. Then, referring to FIG. 4, the gripping unit 84 transports the recording sheet 5 to the fixing device 40 by moving together with the pair of chains 82 and 83.

Operation of Sheet-Transporting Device

Referring to FIG. 10, the image forming apparatus 1 according to the first exemplary embodiment includes the covering member 32 provided to the recess 311 of the second-transfer roller 31 and configured to shield the recess 311 of the second-transfer roller 31 from particles of the toners composing the toner images.

The covering member 32 is driven to be opened and to be closed, as illustrated in FIG. 12, with respective predetermined timings during a period over which a relevant one of the gripping units 84 on the pair of chains 82 and 83 moves from the pair of sprocket wheels 85 to the pair of sprocket wheels 86 provided at the two respective axial ends of the second-transfer roller 31.

In this process, the covering member 32 rotates to the open position before the gripping unit 84 on the pair of chains 82 and 83 reach a predetermined position. Then, with the rotation of the chains 82 and 83, the gripping unit 84 goes into the recess 311 of the second-transfer roller 31, and the covering member 32 rotates to close the recess 311 of the second-transfer roller 31.

Specifically, before the recess 311 of the second-transfer roller 31 reaches the second-transfer position T2, the recess 311 is covered by the covering member 32 as illustrated in FIG. 10.

Referring to FIG. 13, the covering member 32 is opened and is closed with respective predetermined timings after the gripping unit 84 passes through the second-transfer position T2. Thus, the gripping unit 84 on the pair of chains 82 and 83 goes out of the recess 311 of the second-transfer roller 31. In this process, the covering member 32 is driven to be opened and closed in such a manner as not to interfere with the gripping unit 84. Then, referring to FIG. 4, the gripping unit 84 transports the recording sheet 5 to the fixing device 40 by moving together with the pair of chains 82 and 83.

Second Exemplary Embodiment

FIGS. 14 to 17 illustrate relevant elements of an image forming apparatus 1 according to a second exemplary embodiment of the present disclosure. The image forming apparatus 1 according to the second exemplary embodiment is different from the image forming apparatus 1 according to the first exemplary embodiment in that two or more hinges are used to openably attach the shielding component to the transferring component.

Figure 14:
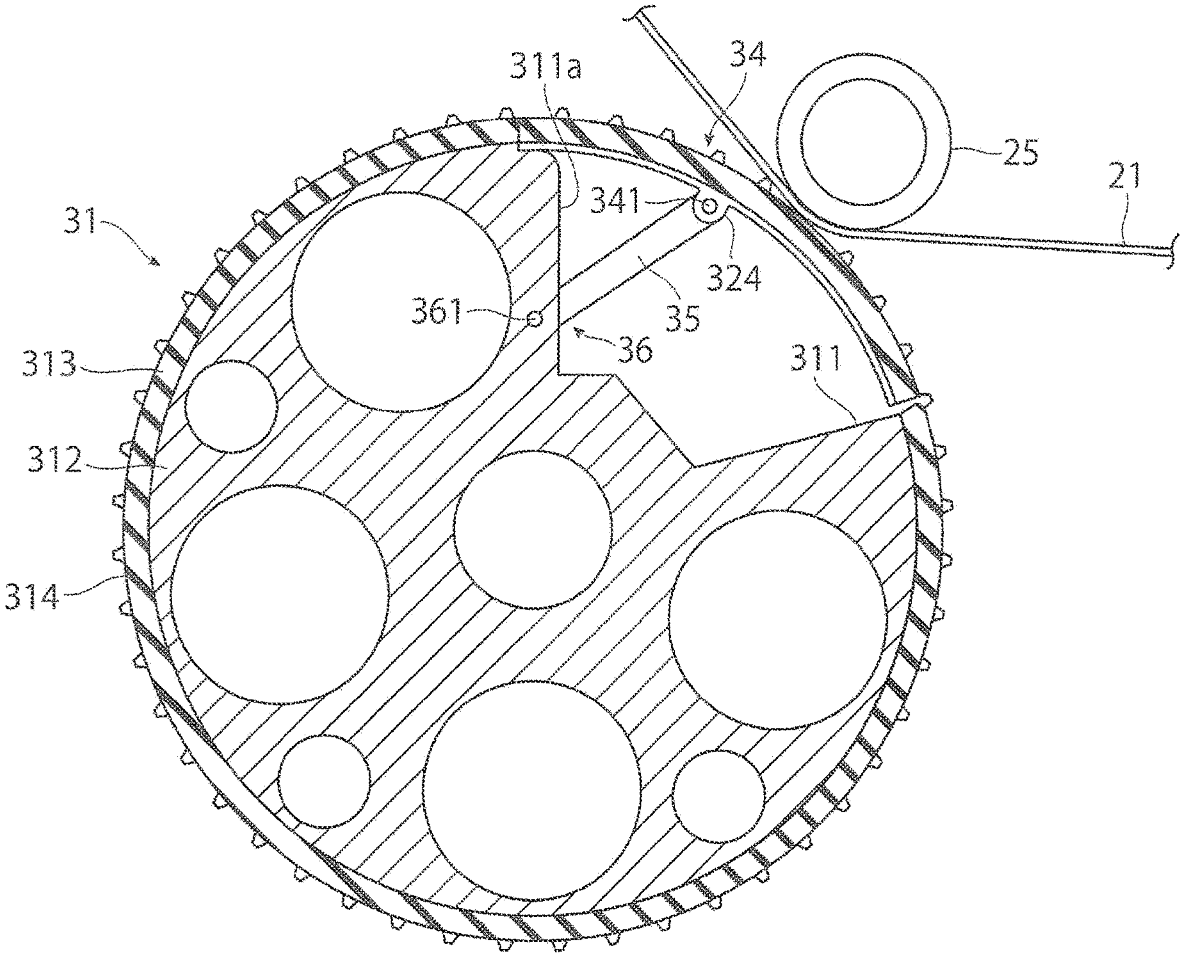
FIG. 14 is a sectional view of relevant elements included in an image forming apparatus according to a second exemplary embodiment of the present disclosure.
Figure 15:
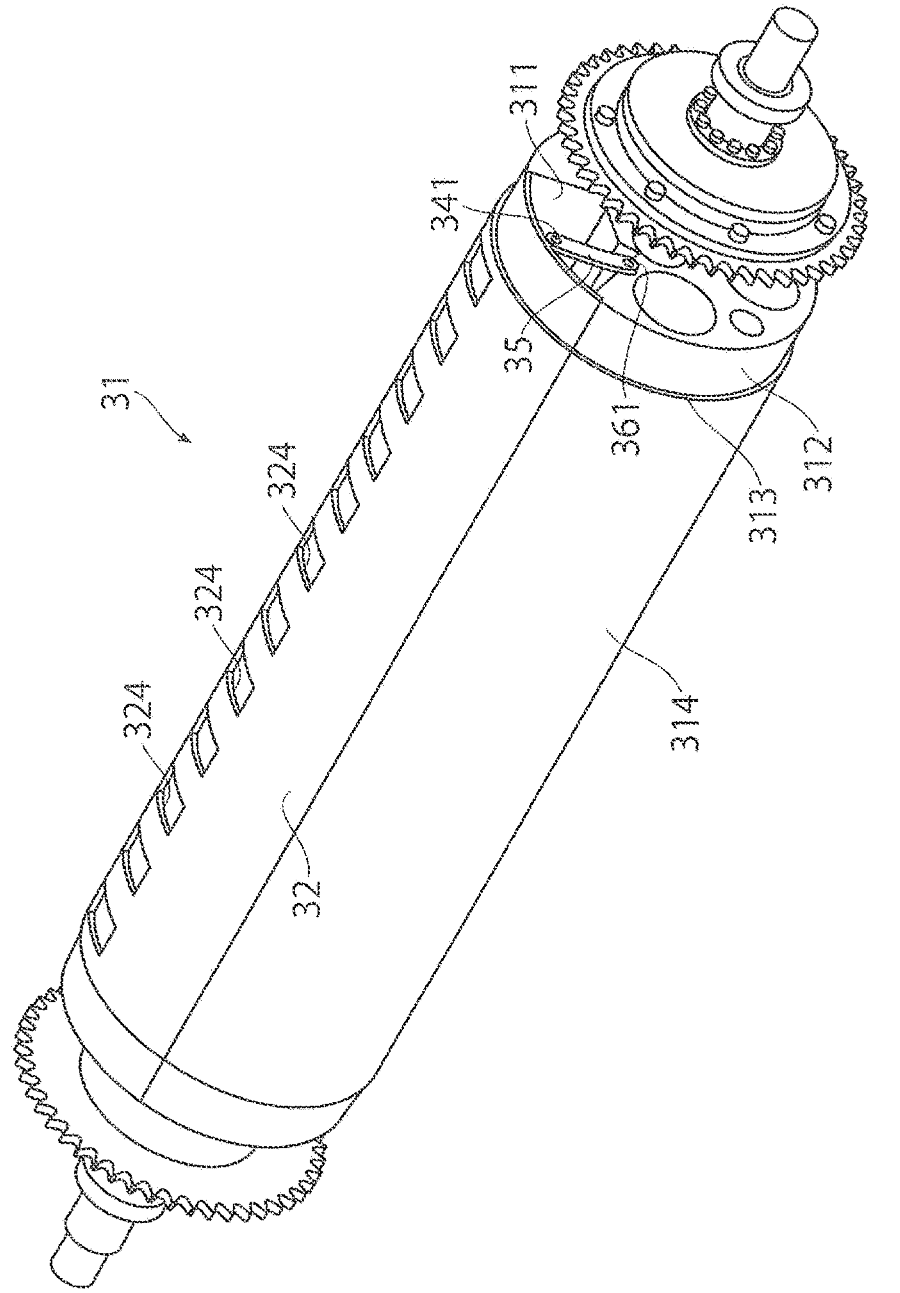
FIG. 15 is a perspective view of relevant elements included in the image forming apparatus according to the second exemplary embodiment of the present disclosure.

Referring to FIGS. 14 and 15, in the image forming apparatus 1 according to the second exemplary embodiment, the covering member 32 provided over the recess 311 of the second-transfer roller 31 includes a first hinge 34, a link 35, and a second hinge 36. The first hinge 34 supports the covering member 32 while allowing the covering member 32 to rotate. The link 35 is rotatably attached at one end thereof to the first hinge 34. The second hinge 36 attaches the other end of the link 35 to the wall of the recess 311 of the second-transfer roller 31 while allowing the link 35 to rotate. Note that the gripping unit 84 is not illustrated in FIGS. 14 and 15.

As illustrated in FIG. 14, the covering member 32 includes a shaft bearing 324. The shaft bearing 324 is provided on the back face of the base plate 321 and at a position on the downstream side with respect to the center of the base plate 321 in the direction of rotation of the second-transfer roller 31. The shaft bearing 324 of the covering member 32 supports a rotary shaft 341 while allowing the rotary shaft 341 to rotate. A combination of the rotary shaft 341 and the shaft bearing 324 forms the first hinge 34. The one end of the link 35 is rotatably attached to the rotary shaft 341.

The other end of the link 35 is rotatably attached to a lower part of a sidewall, 311*a*, of the recess 311 of the second-transfer roller 31 with the aid of a rotary shaft 361. The sidewall 311*a* is a wall of the recess 311 that is on the downstream side in the direction of rotation of the second-transfer roller 31. The rotary shaft 361 is included in the second hinge 36.

Referring to FIG. 15, the link 35 is provided at each of the two axial ends of the second-transfer-roller body 312.

The covering member 32 is opened at the retaining position 90 by a predetermined angle with the aid of a cam member (not illustrated) provided at one axial end or each of the two axial ends of each of the rotary shafts 341 and 361.

Figure 16:
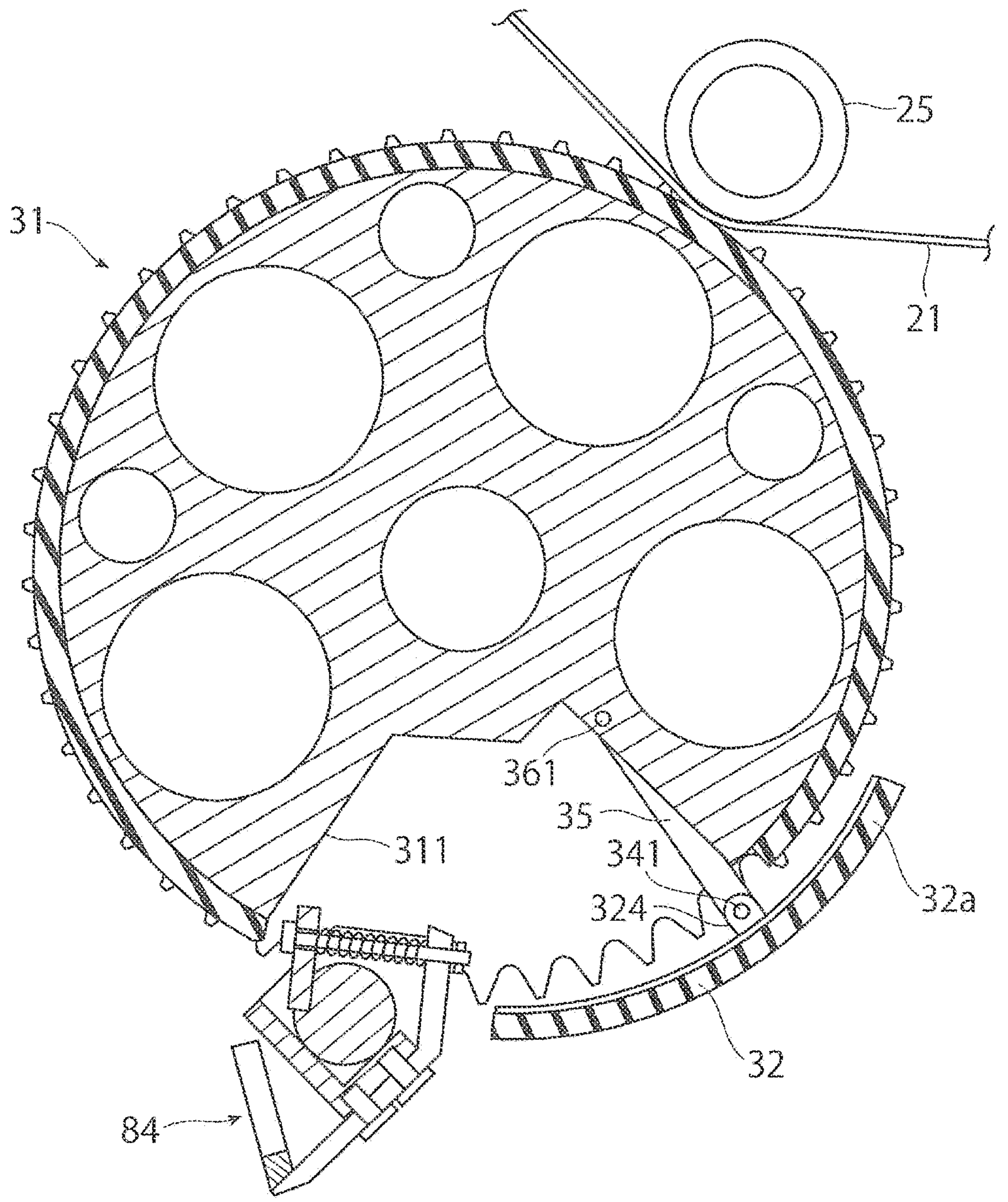
FIG. 16 illustrates how the image forming apparatus according to the second exemplary embodiment of the present disclosure works in sectional view.

More specifically, referring to FIG. 16, the covering member 32 is opened and is closed with respective predetermined timings during a period over which a relevant one of the gripping units 84 carried by and circulating with the pair of chains 82 and 83 moves from the pair of sprocket wheels 85 to the pair of sprocket wheels 86 provided at the two respective axial ends of the second-transfer roller 31. Thus, the gripping unit 84 on the pair of chains 82 and 83 goes into the recess 311 of the second-transfer roller 31.

In this process, the covering member 32 is first tilted such that the end, 32*a*, thereof on the downstream side in the direction of rotation of the second-transfer roller 31 moves radially outward from the recess 311 of the second-transfer roller 31. Subsequently, with the rotation of the link 35, the entirety of the covering member 32 moves toward the downstream side in the direction of rotation of the second-transfer roller 31. Thus, the recess 311 of the second-transfer roller 31 is opened.

Then, after the gripping unit 84 goes into the recess 311 of the second-transfer roller 31, the covering member 32 moves backward, opposite to the above direction, to close the recess 311 of the second-transfer roller 31.

Figure 17:
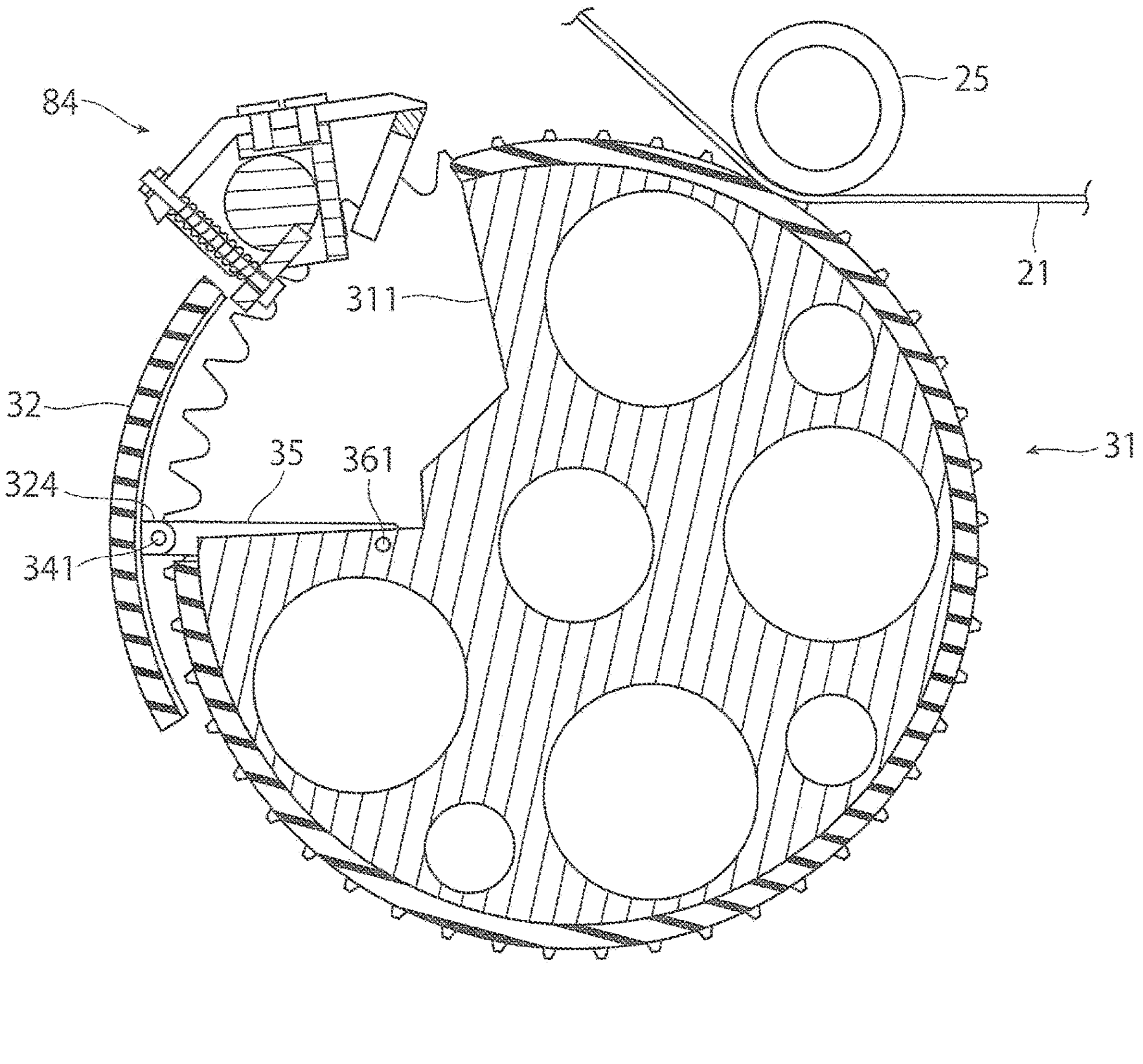
FIG. 17 also illustrates how the image forming apparatus according to the second exemplary embodiment of the present disclosure works in sectional view.

Referring to FIG. 17, the covering member 32 is opened and is closed with respective predetermined timings after the gripping unit 84 passes through the second-transfer position T2. Thus, the gripping unit 84 on the pair of chains 82 and 83 goes out of the recess 311 of the second-transfer roller 31. In this process, the covering member 32 is driven to be opened and closed in such a manner as not to interfere with the gripping unit 84.

The other features are the same as in the first exemplary embodiment, and description of such features is omitted.

Third Exemplary Embodiment

Figure 18:
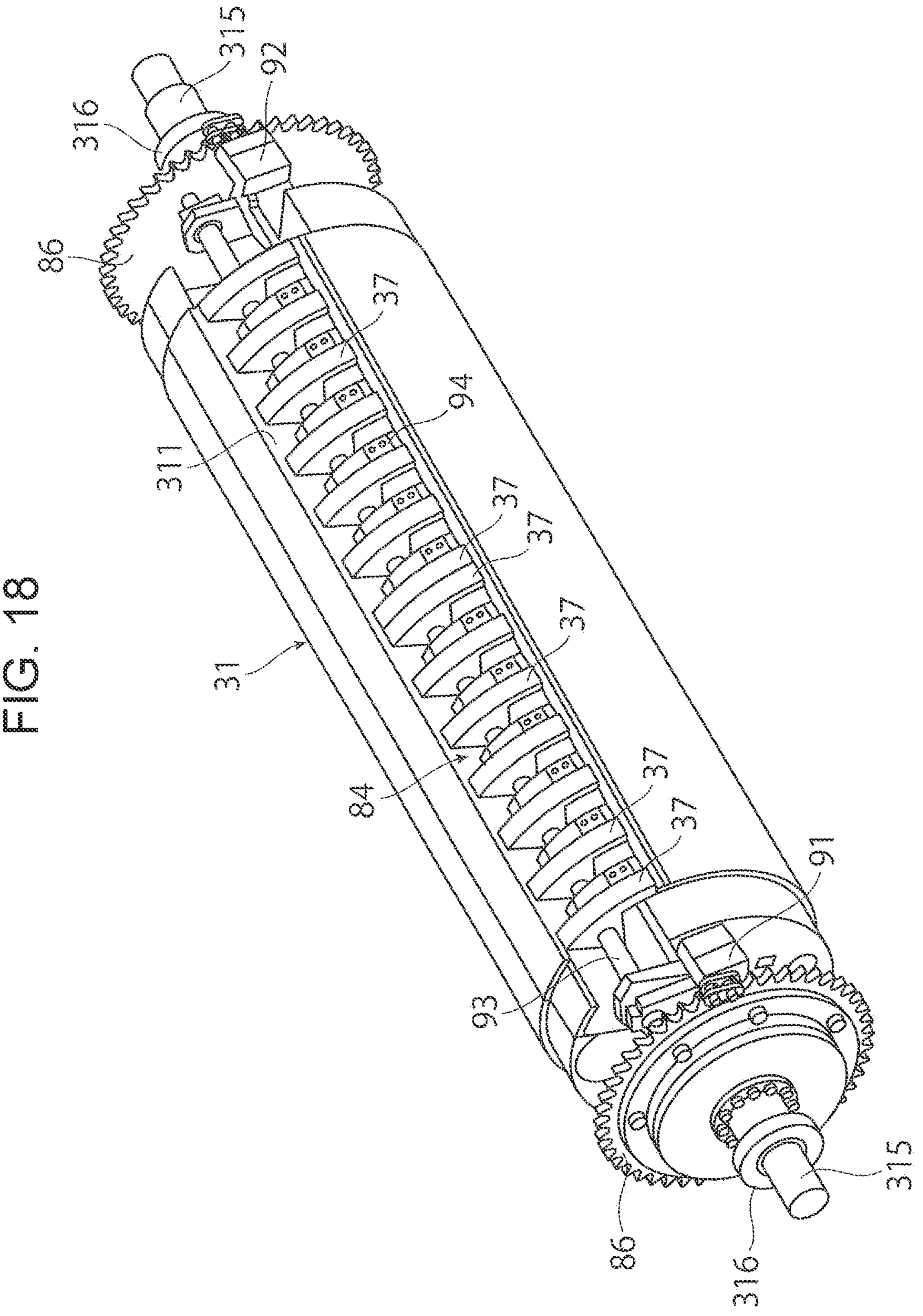
FIG. 18 is a perspective view of relevant elements included in an image forming apparatus according to a third exemplary embodiment of the present disclosure.

FIG. 18 illustrates relevant elements included in an image forming apparatus 1 according to a third exemplary embodiment of the present disclosure. In the third exemplary embodiment, the retainer is configured to grip an end of the recording medium and is to be received by the recess of the transferring component, and the shielding component is included in the retainer.

Figure 19:
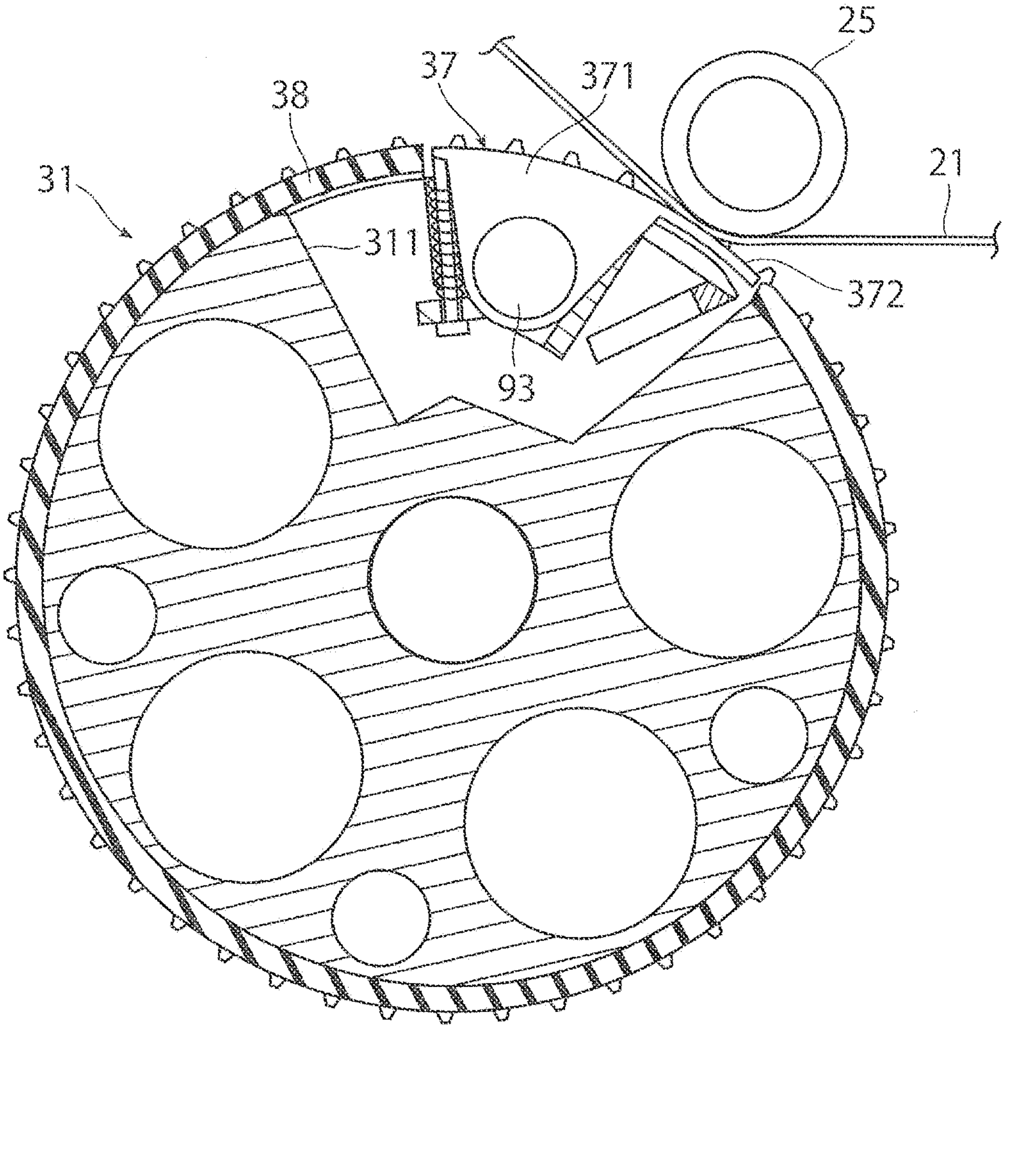
FIG. 19 is a sectional view of relevant elements included in the image forming apparatus according to the third exemplary embodiment of the present disclosure.

Referring to FIGS. 18 and 19, the image forming apparatus 1 according to the third exemplary embodiment includes covering members 37. The covering members 37 are integrated with the gripping unit 84, instead of being provided to the second-transfer roller 31.

The gripping unit 84 includes the driving shaft 93, which causes the catching members 94 to rotate. The covering members 37 are fixed to the driving shaft 93 of the gripping unit 84 at respective positions between the catching members 94.

Referring to FIG. 19, the covering members 37 each include a fixed portion 371 and a shielding portion 372. The fixed portion 371 is fixed to the driving shaft 93. The shielding portion 372 extends from the fixed portion 371 and forms a curve with a curvature radius that is substantially equal to the curvature radius of the outer peripheral surface of the second-transfer roller 31. The shielding portions 372 of the respective covering members 37 are configured to close the respective spaces between the catching members 94 in the recess 311 of the second-transfer roller 31.

In the recess 311 of the second-transfer roller 31 according to the third exemplary embodiment, the length of the space occupied by each of the catching members 94 in the peripheral direction of the second-transfer roller 31 is shorter than the length of the recess 311 in the peripheral direction.

Therefore, the third exemplary embodiment employs a subsidiary covering member 38. The subsidiary covering member 38 covers an area of the recess 311 of the second-transfer roller 31 that is on the downstream side with respect to the gripping unit 84 in the direction of rotation of the second-transfer roller 31. The subsidiary covering member 38 has the same structure as the covering member 32. Note that the subsidiary covering member 38 does not need to be opened and is therefore fixed to the second-transfer-roller body 312.

Figure 20:
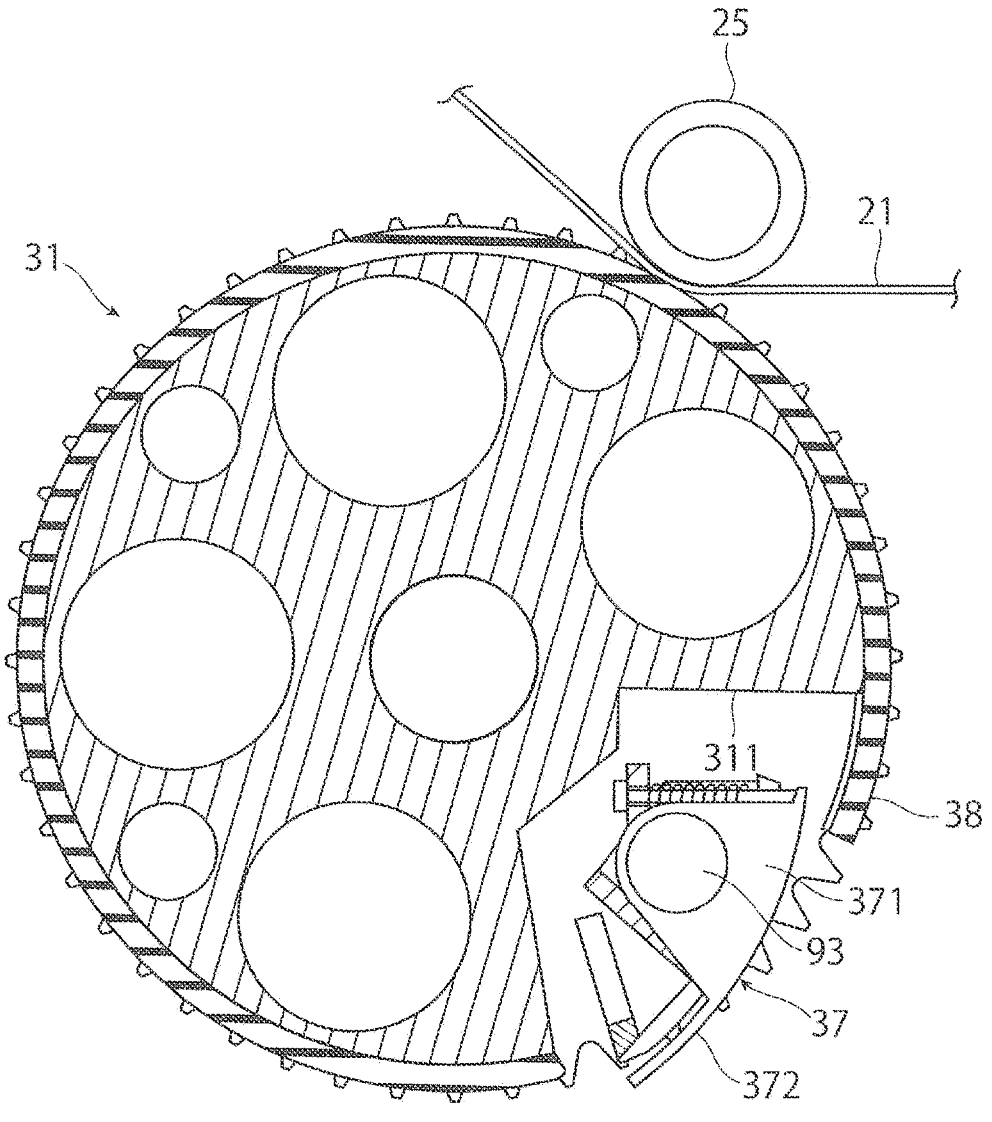
FIG. 20 illustrates how the image forming apparatus according to the third exemplary embodiment of the present disclosure works in sectional view.
Figure 21:
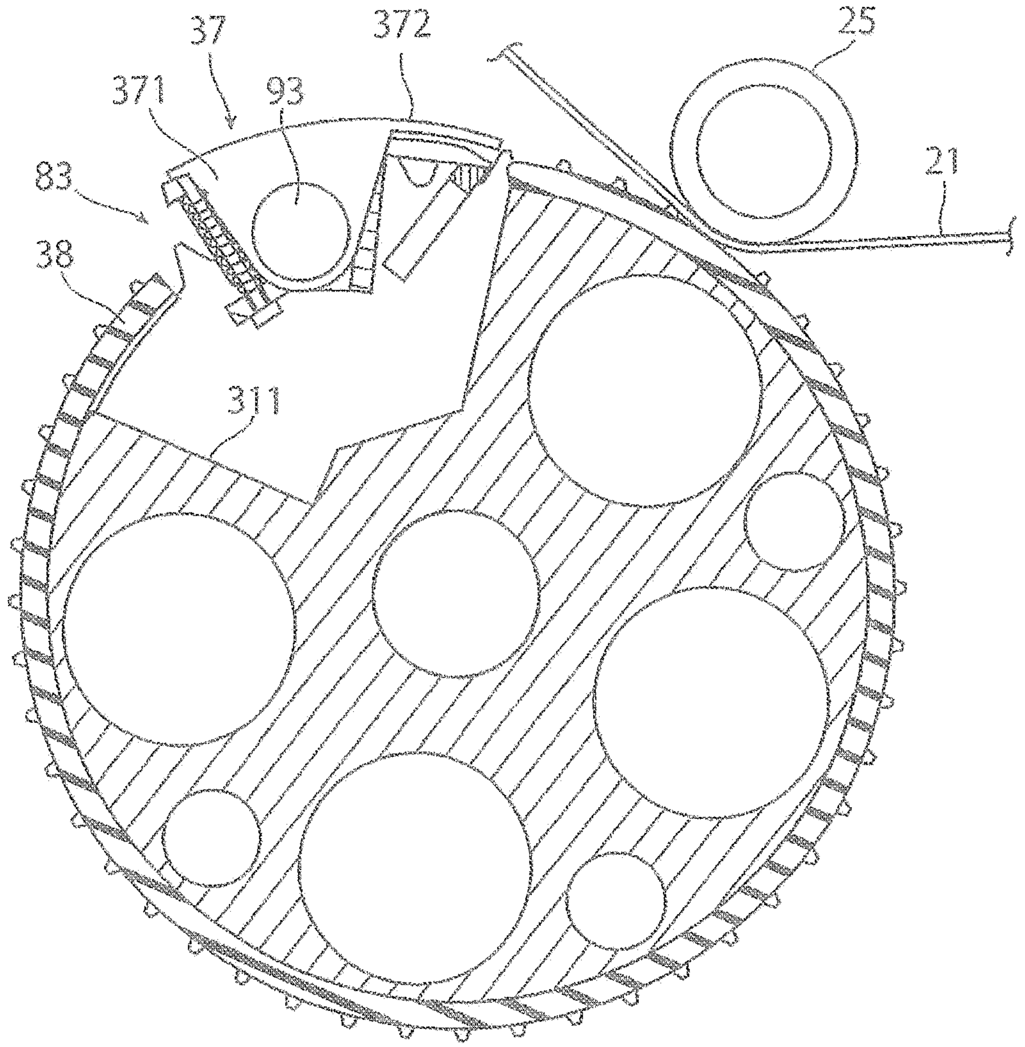
FIG. 21 also illustrates how the image forming apparatus according to the third exemplary embodiment of the present disclosure works in sectional view.

In the image forming apparatus 1 according to the third exemplary embodiment, referring to FIGS. 20 and 21, the gripping unit 84 including the covering member 37 goes into and out of the recess 311 of the second-transfer roller 31.

The other features are the same as in the first exemplary embodiment, and description of such features is omitted.

Fourth Exemplary Embodiment

Figure 22:
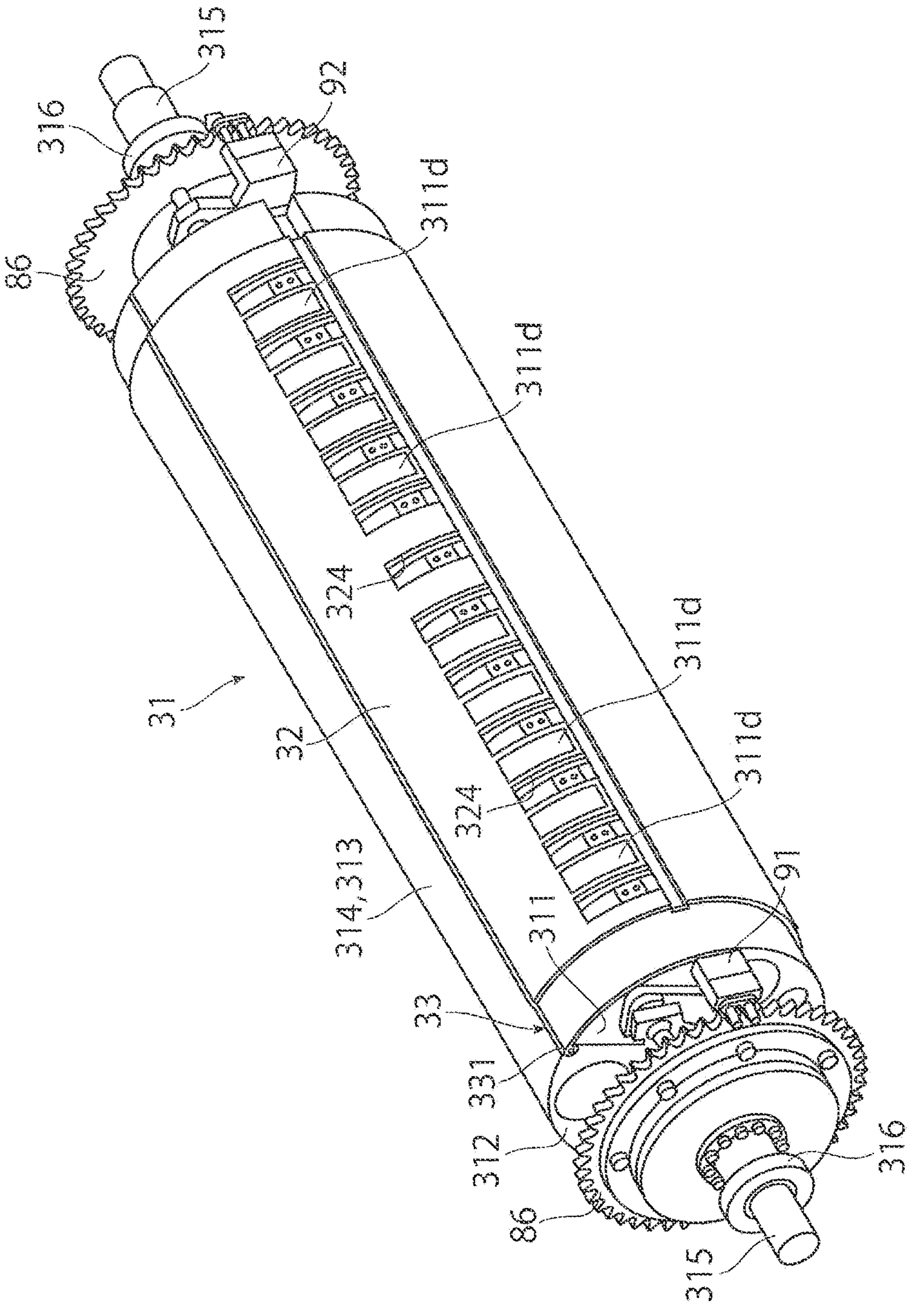
FIG. 22 is a perspective view of relevant elements included in an image forming apparatus according to a fourth exemplary embodiment of the present disclosure.

FIG. 22 illustrates relevant elements included in an image forming apparatus 1 according to a fourth exemplary embodiment of the present disclosure. In the fourth exemplary embodiment, an adjustment image is to be formed in such an area of the image-carrying component as to face the recess of the transferring component, and the shielding component has a recess at such a position as to face the adjustment image.

In the image forming apparatus 1 configured as above, as illustrated in FIG. 1, the imaging devices 10 (Y, M, C, and K) for yellow (Y), magenta (M), cyan (C), and black (K) form respective toner images in the respective colors. The toner images are superposed one on top of another on the intermediate transfer belt 21 in the first-transfer process. The set of toner images in the respective colors thus received by the intermediate transfer belt 21 in the first-transfer process is transferred to a recording sheet 5 at the second-transfer position T2 in the second-transfer process. Thus, a full-color image or any other image is formed on the recording sheet 5.

To achieve a satisfactory quality of the full-color image or any other image to be formed on the recording sheet 5 in the image forming apparatus 1, the imaging devices 10 (Y, M, C, and K) for yellow (Y), magenta (M), cyan (C), and black (K) are expected to accurately form the toner images in the respective colors at respective predetermined image-forming positions (registered positions) and with predetermined image densities.

Figure 23:
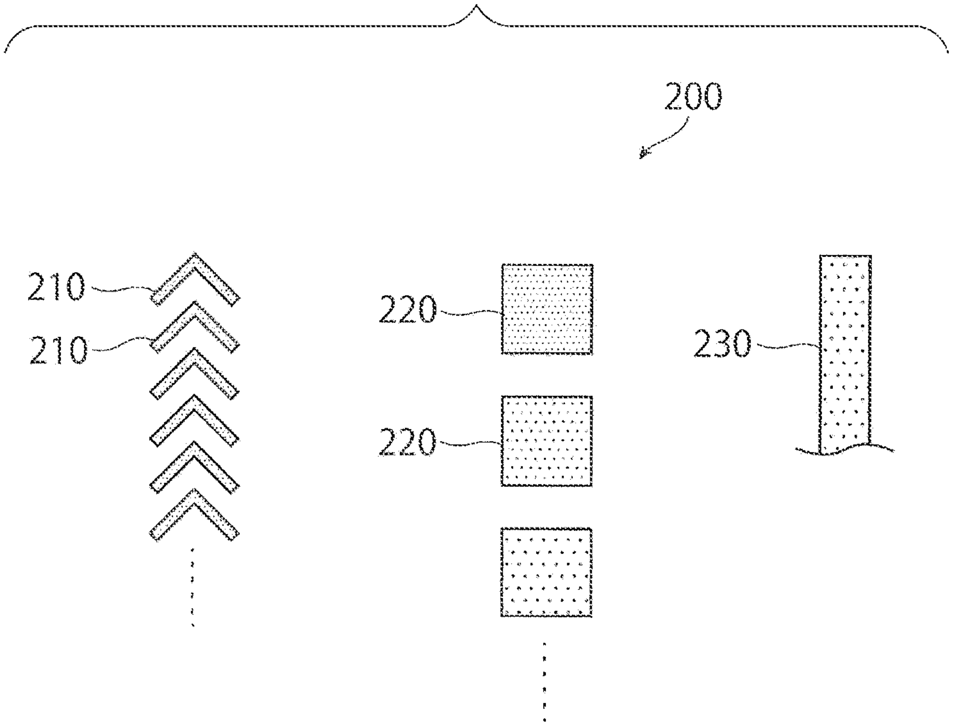
FIG. 23 RELATED ART
FIG. 23 illustrates related-art adjustment images.

Therefore, in the image forming apparatus 1, the imaging devices 10 (Y, M, C, and K) for yellow (Y), magenta (M), cyan (C), and black (K) are each configured to form an adjustment image 200, which is illustrated in FIG. 23. The adjustment image 200 includes any of the following: a registration pattern 210, a density-adjustment patch 220, and a toner band 230. The registration pattern 210 is also called a chevron pattern having an inverted-V shape and is for controlling the position of the image to be formed. The density-adjustment patch 220 is for adjusting the density of the image. The toner band 230 is for suppressing the deterioration in the image quality such as fogging or density reduction due to deterioration of the developer in the developing device 14 of any of the imaging devices 10 (Y, M, C, and K) that is not used for a long time for forming an image of a predetermined density or higher.

Herein, the term “adjustment image” refers to an image other than images that are formed in response to any requests for image formation that are made by users. The adjustment image 200 including any of the registration pattern 210, the density-adjustment patch 220, the toner band 230, and the like is formed with predetermined timings of adjustment-image formation. The timings of adjustment-image formation are as follows: a first formation timing based on environmental factors such as a change by a predetermined degree or higher in any of environmental conditions, including temperature and humidity, inside the apparatus body 1*a* of the image forming apparatus 1; and a second formation timing based on factors regarding the imaging devices 10 (Y, M, C, and K) such as the numbers of images formed by the respective imaging devices 10. The first formation timing is reached at, for example, every change by a predetermined degree or higher in any of environmental conditions, including temperature and humidity, inside the apparatus body 1*a* of the image forming apparatus 1. The second formation timing is reached at, for example, every time the number of revolutions of the photoconductor drum 11 in any of the imaging devices (Y, M, C, and K) reaches a predetermined value, or every time the number of images successively formed with a density lower than predetermined reaches a predetermined value in any of the imaging devices 10 (Y, M, C, and K). The image density of the toner band 230 to be formed by each of the imaging devices 10 (Y, M, C, and K) is set to, for example, a moderate density (about 50%) in consideration of the convenience of supply of toners to the surfaces of the photoconductor drums 11 but may be higher or lower than the moderate density.

The adjustment images 200 formed by the imaging devices 10 (Y, M, C, and K) are transferred to the intermediate transfer belt 21 in the first-transfer process. Then, the intermediate transfer belt 21 is detected by an image sensor S, illustrated in FIG. 1, such as a linear image sensor. The image sensor S is an exemplary detector and is provided at a detection position where the intermediate transfer belt is supported by the belt-supporting roller 23. The adjustment images 200 thus transferred to the intermediate transfer belt 21 are not transferred to the recording sheet 5 but are removed by the belt-cleaning device 27. The detector is not limited to the image sensor S such as a linear image sensor and may be a sensor provided locally in an area that is to face the adjustment images 200.

The adjustment images 200 formed on the intermediate transfer belt 21 pass through the second-transfer position T2. Therefore, the adjustment images 200 may be transferred to and contaminate the surface of the second-transfer roller 31. Although the second-transfer roller 31 includes the roller-cleaning device CL, it is difficult to completely remove the toner particles composing the adjustment images 200. If any particles of the toners composing the adjustment images 200 adhere to the surface of the second-transfer roller 31, such toner particles may be transferred to and contaminate the back side of the recording sheet 5 retained on the surface of the second-transfer roller 31.

Figure 24:
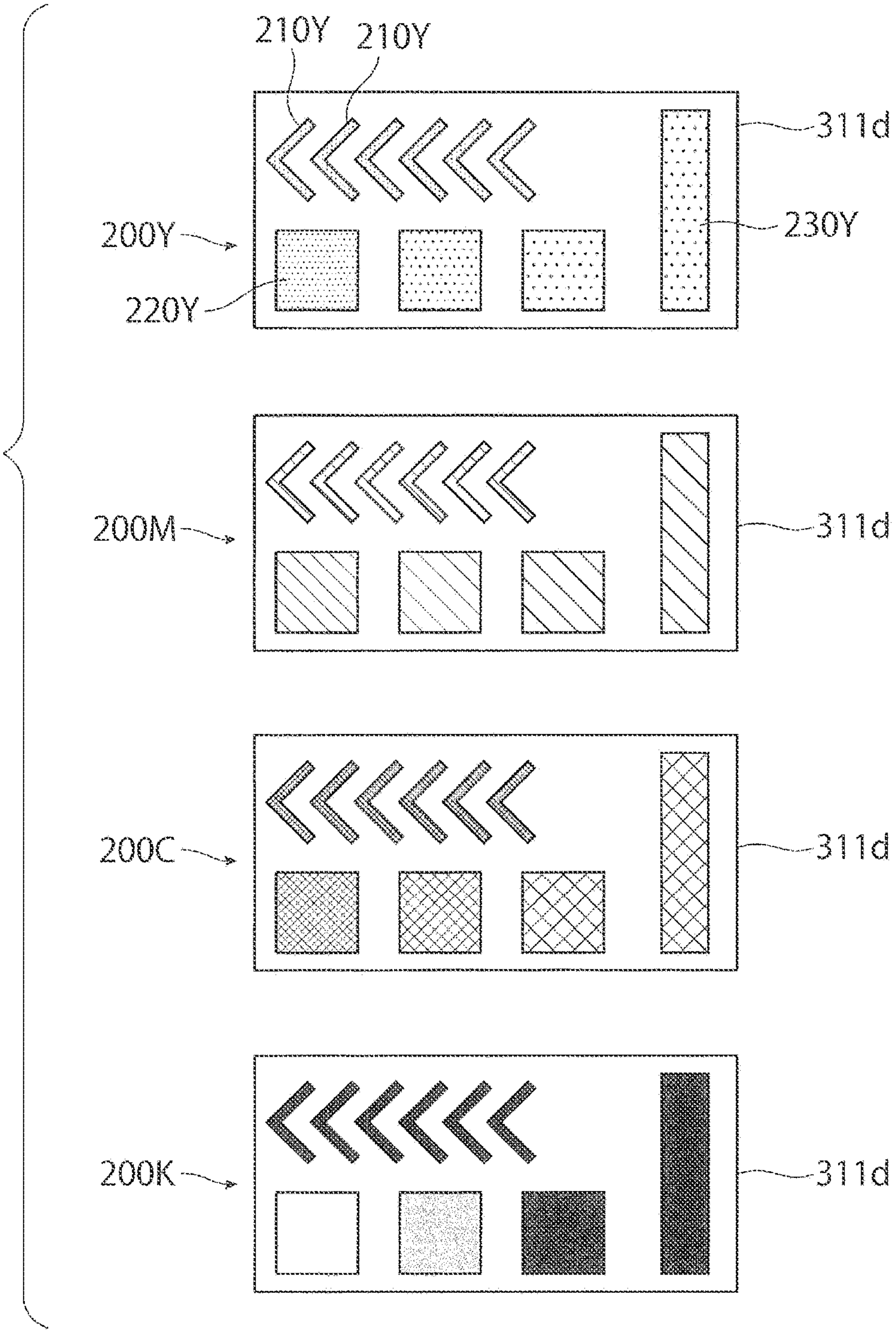
FIG. 24 illustrates adjustment images to be formed by the image forming apparatus according to the fourth exemplary embodiment of the present disclosure.

Hence, in the image forming apparatus 1 according to the fourth exemplary embodiment, the imaging devices 10 (Y, M, C, and K) serving as exemplary image-forming components are configured to form respective adjustment images 200, illustrated in FIG. 24, within such an area of the intermediate transfer belt 21 as to face the recess 311 of the second-transfer roller 31.

Specifically, in the image forming apparatus 1 according to the fourth exemplary embodiment, the imaging devices 10 (Y, M, C, and K) for yellow (Y), magenta (M), cyan (C), and black (K) form respective adjustment images 200 in the respective colors as illustrated in FIG. 24. The adjustment images 200 thus formed in the imaging devices 10 (Y, M, C, and K) are transferred to the intermediate transfer belt 21 at the respective first-transfer positions T1 in the first-transfer process and then move with the rotation of the intermediate transfer belt 21 to the second-transfer position T2, where the adjustment images 200 face the second-transfer roller 31.

In this process, the adjustment images 200 are controlled by the control device 100 to be transferred to such an area of the intermediate transfer belt 21 as to face the recess 311 of the second-transfer roller 31.

More specifically, the adjustment images 200 transferred to the intermediate transfer belt 21 are located within an area that is to face the recess 311 of the second-transfer roller 31 and at respective positions that are to face corresponding ones of recesses 311*d*, which are provided in the covering member 32 in such a manner as to be positioned between the catching members 94.

The covering member 32 of the second-transfer roller 31 has the recesses 311*d* that are to be positioned between the catching members 94. The adjustment images 200 transferred to the intermediate transfer belt 21 are positioned in such a manner as to face corresponding ones of the recesses 311*d*.

Therefore, in the image forming apparatus 1 according to the fourth exemplary embodiment, the adjustment images 200 formed on the intermediate transfer belt 21 and passing through the second-transfer position T2 pass over the corresponding ones of the recesses 311*d* provided in the covering member 32.

Figure 25:
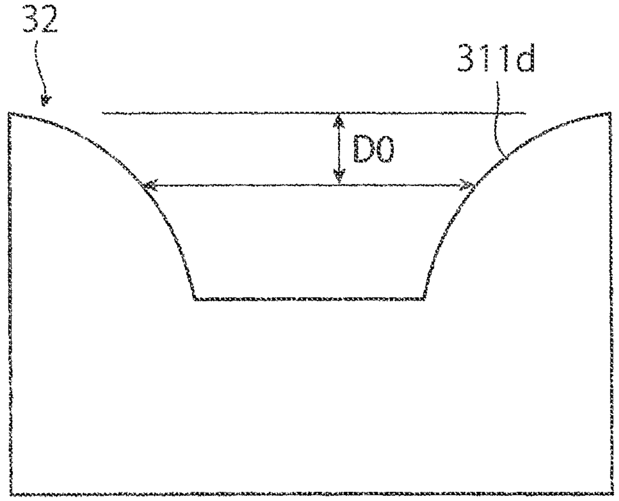
FIG. 25 illustrates a recess provided in a covering member included in a second-transfer roller.

FIG. 25 schematically illustrates one of the recesses 311*d* provided in the covering member 32.

As described above, the second-transfer roller 31 is supplied with a second-transfer voltage from a high-voltage power source device (not illustrated). In the fourth exemplary embodiment, the second-transfer voltage is kept being supplied to the second-transfer roller 31 when the adjustment images 200 transferred to the intermediate transfer belt 21 pass over the recesses 311*d* provided in the covering member 32.

Whether particles of the toners composing the adjustment images 200 are transferred to the recesses 311*d* of the covering member 32 when the adjustment images 200 on the intermediate transfer belt 21 pass over the recesses 311*d* of the covering member 32 depends on to what extent the transfer electric field acts on the toners composing the adjustment images 200 on the intermediate transfer belt 21.

Figure 26:
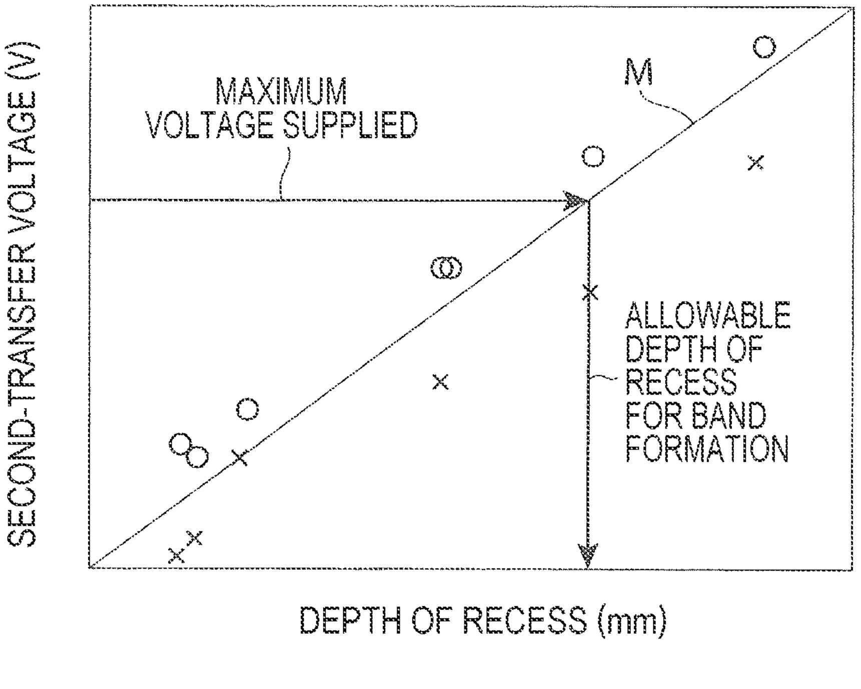
FIG. 26 is a graph illustrating the relationship between the depth of the recess provided in the covering member of the second-transfer roller and a second-transfer voltage.

FIG. 26 is a graph illustrating the relationship between the second-transfer voltage supplied to the second-transfer roller 31 and the depth of the recesses 311*d* provided in the covering member 32. In FIG. 26, the cross marks each represent a case where some particles of the toners composing the adjustment images 200 on the intermediate transfer belt 21 are transferred to the recesses 311*d* of the covering member 32, whereas the circular marks each represent a case where no particles of the toners composing the adjustment images 200 on the intermediate transfer belt 21 are transferred to the recesses 311*d* of the covering member 32.

As is understood from FIG. 26, as the second-transfer voltage supplied to the second-transfer roller 31 increases, the circular marks representing the cases where no particles of the toners composing the adjustment images 200 on the intermediate transfer belt 21 are transferred to the recesses 311*d* of the covering member 32 are shifted in the direction of increase in the depth of the recesses 311*d* of the covering member 32.

FIG. 26 also illustrates a line M, which represents the boundary between the area of the cases plotted by the cross marks where some particles of the toners composing the adjustment images 200 on the intermediate transfer belt 21 are transferred to the recesses 311*d* of the covering member 32 and the area of the cases plotted by the circular marks where no particles of the toners composing the adjustment images 200 on the intermediate transfer belt 21 are transferred to the recesses 311*d* of the covering member 32. In the area above the line M, no particles of the toners composing the adjustment images 200 on the intermediate transfer belt 21 are transferred to the recesses 311*d* of the covering member 32.

That is, the area where no particles of the toners composing the adjustment images 200 on the intermediate transfer belt 21 are transferred to the recesses 311*d* of the covering member 32 varies with the second-transfer voltage supplied to the second-transfer roller 31. If the second-transfer voltage supplied to the second-transfer roller 31 is relatively low and the depth of the recesses 311*d* is relatively small, some particles of the toners composing the adjustment images 200 on the intermediate transfer belt 21 are transferred to the recesses 311*d* of the covering member 32, as plotted by the cross marks.

In the fourth exemplary embodiment, referring to FIG. 25, the adjustment images 200 are each formed to be positioned within an area of a corresponding one of the recesses 311*d* where the depth of the recess 311*d* that is determined by the second-transfer voltage supplied to the second-transfer roller 31 is greater than DO as to be plotted by a circular mark in the area above the line M.

Fifth Exemplary Embodiment

Figure 27:
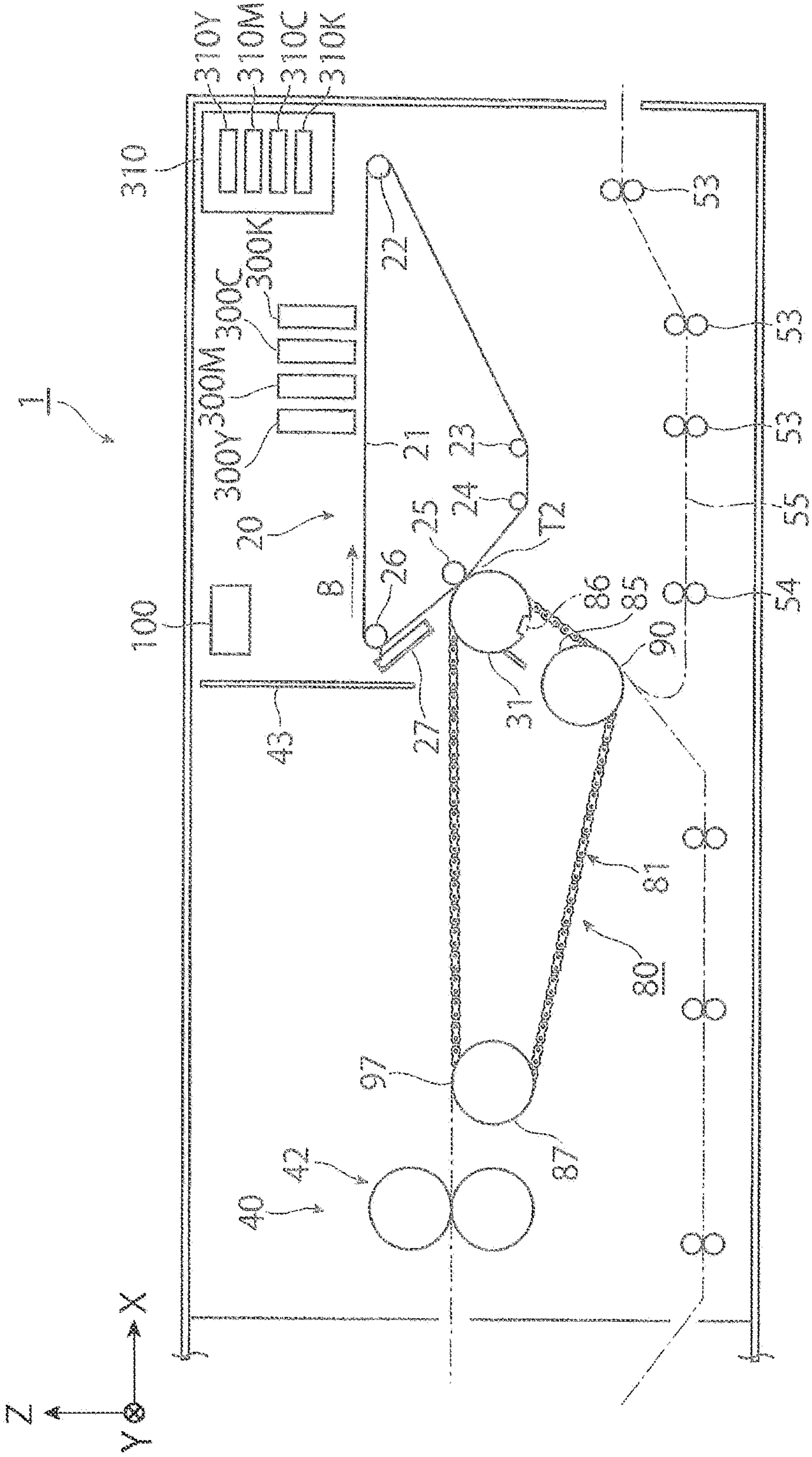
FIG. 27 illustrates relevant elements included in an image forming apparatus according to a fifth exemplary embodiment of the present disclosure.

FIG. 27 illustrates an image forming apparatus 1 according to a fifth exemplary embodiment of the present disclosure. The image forming apparatus 1 according to the fifth exemplary embodiment is configured as a color printer that forms a color image by, for example, a so-called inkjet scheme.

The image forming section 2 of the image forming apparatus 1 includes a plurality of inkjet heads 300, which are configured to form respective images by ejecting respective inks toward a recording medium. The inkjet heads 300, which are inkjet heads 300Y; 300M; 300C; and 300K, are provided for respective inks, which are exemplary colorants, having the colors of yellow (Y), magenta (M), cyan (C), and black (K). The inkjet heads 300Y, 300M, 300C, and 300K for the respective colors are arranged side by side in that order in the direction of rotation of the intermediate transfer belt 21. The inkjet heads 300 are each controlled by the control device 100 to form an image on the intermediate transfer belt 21 by ejecting ink droplets thereto.

The inkjet heads 300Y, 300M, 300C, and 300K are supplied with the respective inks having the respective colors from an ink cartridge 310. The ink cartridge 310 includes ink cartridges 310Y, 310M, 310C, and 310K for the respective inks having the colors of yellow (Y), magenta (M), cyan (C), and black (K). The ink cartridges 310Y, 310M, 310C, and 310K contain the inks having the respective colors.

In the fifth exemplary embodiment, for example, the inks having the colors of yellow (Y), magenta (M), cyan (C), and black (K) each contain a magnetic substance and are curable with light such as ultraviolet light. A set of images formed with the inks having the respective colors on the intermediate transfer belt 21 is magnetically transferred at the second-transfer position T2 to a recording sheet 5 that moves along the second-transfer roller 31.

The set of ink images in the respective colors of yellow (Y), magenta (M), cyan (C), and black (K) thus transferred to the recording sheet 5 is cured with light such as ultraviolet light. Therefore, the fixing device 40 according to the fifth exemplary embodiment, which is illustrated as a pair of rollers as a matter of convenience, is a device configured to emit light such as ultraviolet light.

The other features are the same as in the first exemplary embodiment, and description of such features is omitted.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:

an image-carrying component configured to carry a colorant image including an adjustment image;

a transferring component having a recess in an outer peripheral surface and configured to transfer the colorant image from the image-carrying component to a recording medium in a transfer area while rotating in such a manner as to allow a retainer that is retaining the recording medium to pass through the recess;

a transporting component configured to cause the recording medium retained by the retainer to pass through the transfer area; and a shielding component configured to shield the recess of the transferring component from colorant particles composing the colorant image.

2. The image forming apparatus according to claim 1, wherein the shielding component is an openable covering member that is separate from the retainer.

3. The image forming apparatus according to claim 2, wherein the shielding component is openably attached to the transferring component with at least one hinge.

4. The image forming apparatus according to claim 3, wherein, at a position where the recess of the transferring component is to be opened, the shielding component exposes the recess by moving toward a downstream side in a direction of rotation of the transferring component such that the retainer goes into the exposed recess.

5. The image forming apparatus according to claim 4, wherein the shielding component is opened and is closed at each of a time when the retainer goes into the recess of the transferring component and a time when the retainer goes out of the recess of the transferring component.

6. The image forming apparatus according to claim 3, wherein the shielding component is configured to expose the recess by moving along the outer peripheral surface of the transferring component such that the retainer goes into the exposed recess.

7. The image forming apparatus according to claim 6, wherein the shielding component is opened and is closed at each of a time when the retainer goes into the recess of the transferring component and a time when the retainer goes out of the recess of the transferring component.

8. The image forming apparatus according to claim 3, wherein the shielding component is opened and is closed at each of a time when the retainer goes into the recess of the transferring component and a time when the retainer goes out of the recess of the transferring component.

9. The image forming apparatus according to claim 2, wherein, at a position where the recess of the transferring component is to be opened, the shielding component exposes the recess by moving toward a downstream side in a direction of rotation of the transferring component such that the retainer goes into the exposed recess.

10. The image forming apparatus according to claim 9, wherein the shielding component is opened and is closed at each of a time when the retainer goes into the recess of the transferring component and a time when the retainer goes out of the recess of the transferring component.

11. The image forming apparatus according to claim 2, wherein the shielding component is configured to expose the recess by moving along the outer peripheral surface of the transferring component such that the retainer goes into the exposed recess.

12. The image forming apparatus according to claim 11, wherein the shielding component is opened and is closed at each of a time when the retainer goes into the recess of the transferring component and a time when the retainer goes out of the recess of the transferring component.

13. The image forming apparatus according to claim 2, wherein the shielding component is opened and is closed at each of a time when the retainer goes into the recess of the transferring component and a time when the retainer goes out of the recess of the transferring component.

14. The image forming apparatus according to claim 1,
wherein the retainer is configured to retain an end of the recording medium and is to be received by the recess of the transferring component, and
wherein the shielding component is included in the retainer.

15. The image forming apparatus according to claim 14,
wherein the retainer includes:
a catching member configured to catch a leading end of the recording medium; and
an opening-and-closing member configured to open and close the catching member, and
wherein the shielding component includes at least the catching member of the retainer.

16. The image forming apparatus according to claim 1, further comprising:
an image-forming component configured to form the adjustment image at such a position of the image-carrying component as to face the recess of the transferring component,
wherein the shielding component has a portion that is to face the adjustment image, the portion being located on a radially inner side with respect to the outer peripheral surface of the transferring component.

17. The image forming apparatus according to claim 16,
wherein the portion of the shielding component that is located on the radially inner side with respect to the outer peripheral surface of the transferring component extends continuously in an axial direction of the transferring component.

18. The image forming apparatus according to claim 16, wherein the portion of the shielding component that is located on the radially inner side with respect to the outer peripheral surface of the transferring component has such a depth that the adjustment image is prevented from being electrostatically transferred to the portion when the transferring component is supplied with a transfer voltage.

19. An image forming apparatus comprising:
means for carrying a colorant image including an adjustment image;
means for transferring the colorant image from the means for carrying the colorant image to a recording medium in a transfer area while rotating in such a manner as to allow a retainer that is retaining the recording medium to pass through a recess provided in an outer peripheral surface of the means for transferring the colorant image;
means for transporting the recording medium in such a manner as to cause the recording medium retained by the retainer to pass through the transfer area; and
means for shielding the recess of the transferring component from colorant particles composing the colorant image.

* * * * *